United States Patent
Etwaru et al.

(10) Patent No.: US 11,483,156 B1
(45) Date of Patent: Oct. 25, 2022

(54) INTEGRATING DIGITAL CONTENT INTO DISPLAYED DATA ON AN APPLICATION LAYER VIA PROCESSING CIRCUITRY OF A SERVER

(71) Applicant: Mobeus Industries, Inc., Sparta, NJ (US)

(72) Inventors: Dharmendra Etwaru, Sparta, NJ (US); David Casper, St. Pete Beach, FL (US)

(73) Assignee: Mobeus Industries, Inc., Sparta, NJ (US)

(*) Notice: Subject to any disclaimer, the term of this patent is extended or adjusted under 35 U.S.C. 154(b) by 0 days.

(21) Appl. No.: 17/675,683

(22) Filed: Feb. 18, 2022

Related U.S. Application Data

(60) Provisional application No. 63/249,120, filed on Sep. 28, 2021, provisional application No. 63/182,391, filed on Apr. 30, 2021.

(51) Int. Cl.
*H04L 9/32* (2006.01)
*H04L 9/40* (2022.01)

(52) U.S. Cl.
CPC ........ *H04L 9/3213* (2013.01); *H04L 63/0807* (2013.01); *H04L 63/102* (2013.01); *H04L 63/107* (2013.01)

(58) Field of Classification Search
None
See application file for complete search history.

(56) References Cited

U.S. PATENT DOCUMENTS

| | | |
|---|---|---|
| 7,013,428 B1 | 3/2006 | Kamen |
| 8,813,154 B1 | 8/2014 | Sivertsen |
| 9,325,809 B1 | 4/2016 | Barros et al. |
| 9,792,895 B2 | 10/2017 | Khintsitskiy |
| 10,236,006 B1 | 3/2019 | Gurijala et al. |
| 10,567,733 B2 | 2/2020 | Cole |
| 10,742,634 B1 * | 8/2020 | Shahbazi ............. H04W 12/77 |
| 11,064,149 B1 | 7/2021 | Paun |

(Continued)

OTHER PUBLICATIONS

International Search Report and Written Opinion of the International Searching Authority dated Nov. 23, 2021, in PCT/US 21/46976, filed Aug. 20, 2021.

(Continued)

*Primary Examiner* — Arezoo Sherkat
(74) *Attorney, Agent, or Firm* — Oblon, McClelland, Maier & Neustadt, L.L.P.

(57) ABSTRACT

A method that includes receiving, via processing circuitry of a server, a unique identifier having encoded data included in a reference patch embedded in displayed data received by an electronic device, the electronic device being instructed to display the displayed data in a first layer of the electronic device, the server being inaccessible by the first layer of the electronic device; identifying an identity of a user based on the unique identifier of the reference patch; upon determining the user is authorized to receive the secondary digital content, transmitting the secondary digital content to the electronic device; and instructing the electronic device to display the secondary digital content in a second layer of the electronic device, the server being accessible by the second layer of the electronic device, the first layer of the electronic device being different from the second layer of the electronic device.

20 Claims, 18 Drawing Sheets

(56) References Cited

U.S. PATENT DOCUMENTS

| | | |
|---|---|---|
| 2002/0056136 A1 | 5/2002 | Wistendahl et al. |
| 2003/0234790 A1 | 12/2003 | Hochmuth |
| 2004/0130552 A1 | 7/2004 | Duluk, Jr. et al. |
| 2005/0219241 A1 | 10/2005 | Chun |
| 2007/0009179 A1 | 1/2007 | Easwar |
| 2008/0066092 A1 | 3/2008 | Laude et al. |
| 2008/0137848 A1 | 6/2008 | Kocher et al. |
| 2008/0140714 A1 | 6/2008 | Rhoads et al. |
| 2009/0245516 A1 | 10/2009 | Ravikiran |
| 2010/0153848 A1 | 6/2010 | Saha |
| 2012/0032977 A1 | 2/2012 | Kim et al. |
| 2012/0088543 A1 | 4/2012 | Lindner et al. |
| 2012/0095958 A1 | 4/2012 | Pereira et al. |
| 2012/0114249 A1 | 5/2012 | Conwell |
| 2012/0169928 A1 | 7/2012 | Casagrande et al. |
| 2012/0207208 A1 | 8/2012 | Wyatt |
| 2012/0272279 A1 | 10/2012 | Lim |
| 2013/0044129 A1* | 2/2013 | Latta .............. H04N 13/344 345/633 |
| 2013/0047180 A1 | 2/2013 | Moon et al. |
| 2013/0183952 A1 | 7/2013 | Davis et al. |
| 2013/0294648 A1 | 11/2013 | Rhoads et al. |
| 2014/0172429 A1 | 6/2014 | Butcher et al. |
| 2014/0201769 A1 | 7/2014 | Neumeier |
| 2014/0304316 A1 | 10/2014 | Thulasiraman et al. |
| 2015/0039993 A1 | 2/2015 | Ishimaru |
| 2015/0074735 A1 | 3/2015 | Herigstad et al. |
| 2015/0097850 A1 | 4/2015 | Craik et al. |
| 2015/0113557 A1 | 4/2015 | Kim |
| 2015/0163345 A1 | 6/2015 | Comaby |
| 2015/0195288 A1 | 7/2015 | Hoyos et al. |
| 2015/0287220 A1 | 10/2015 | Jain et al. |
| 2015/0034141 A1 | 11/2015 | Schrempp |
| 2015/0319510 A1 | 11/2015 | Ould, VIII |
| 2015/0358525 A1 | 12/2015 | Lord |
| 2016/0109954 A1 | 4/2016 | Harris |
| 2016/0328871 A1 | 11/2016 | Chen |
| 2017/0026621 A1 | 1/2017 | Vellanki et al. |
| 2017/0052654 A1 | 2/2017 | Cervelli et al. |
| 2017/0155933 A1 | 6/2017 | Del Strother |
| 2017/0185251 A1 | 6/2017 | Jain |
| 2017/0195753 A1 | 7/2017 | Dakss |
| 2017/0255614 A1 | 9/2017 | Vukosavljevic et al. |
| 2017/0278289 A1 | 9/2017 | Marino et al. |
| 2017/0304725 A1 | 10/2017 | Perlman et al. |
| 2017/0344552 A1 | 11/2017 | Golbandi |
| 2018/0004204 A1 | 1/2018 | Rider |
| 2018/0046602 A1 | 2/2018 | Sisson |
| 2018/0096502 A1 | 4/2018 | Kansara |
| 2018/0122114 A1 | 5/2018 | Luan et al. |
| 2018/0124370 A1 | 5/2018 | Bejot |
| 2018/0143950 A1 | 5/2018 | Al-Arnaouti et al. |
| 2018/0150696 A1 | 5/2018 | Li |
| 2018/0189922 A1 | 7/2018 | Chinnadurai et al. |
| 2018/0219814 A1 | 8/2018 | Maarek |
| 2018/0307846 A1 | 10/2018 | Hertling et al. |
| 2018/0308257 A1 | 10/2018 | Boyce |
| 2018/0343481 A1 | 11/2018 | Loheide et al. |
| 2019/0065152 A1 | 2/2019 | Jaroch |
| 2019/0206113 A1 | 7/2019 | Kipp et al. |
| 2019/0207885 A1* | 7/2019 | Kozhemiak .......... H04L 51/046 |
| 2019/0213625 A1 | 7/2019 | Bhattacharjee |
| 2019/0236816 A1 | 8/2019 | Wang et al. |
| 2019/0259124 A1 | 8/2019 | Barnett |
| 2019/0295208 A1 | 9/2019 | Hoatry |
| 2019/0317763 A1 | 10/2019 | Sakamoto et al. |
| 2019/0332883 A1 | 10/2019 | Ivanovic |
| 2020/0110482 A1 | 4/2020 | Vu et al. |
| 2020/0169736 A1 | 5/2020 | Petajan |
| 2020/0184658 A1 | 6/2020 | Cui |
| 2020/0245021 A1 | 7/2020 | Kitazato |
| 2020/0257920 A1* | 8/2020 | Kumar ................ G06V 10/443 |
| 2020/0273251 A1 | 8/2020 | Palos et al. |
| 2020/0389293 A1 | 12/2020 | Lambert et al. |
| 2020/0396521 A1 | 12/2020 | Weiner et al. |
| 2021/0004650 A1 | 1/2021 | Frank |
| 2021/0168416 A1 | 6/2021 | Weiner |
| 2021/0192302 A1 | 6/2021 | Wang |
| 2021/0200501 A1* | 7/2021 | Stankoulov ........... G06F 3/0488 |
| 2021/0344991 A1* | 11/2021 | Todd ................ H04N 21/4622 |
| 2022/0019780 A1 | 1/2022 | Ozserin et al. |
| 2022/0067415 A1 | 3/2022 | Kerofsky |
| 2022/0105193 A1 | 3/2022 | Li |
| 2022/0114584 A1 | 4/2022 | Conley et al. |
| 2022/0138994 A1 | 5/2022 | Viswanathan et al. |

OTHER PUBLICATIONS

International Search Report and Written Opinion of the International Searching Authority dated Jun. 1, 2022, in PCT/US22/20244, filed Mar. 14, 2022, 12 pages.

International Search Report and Written Opinion of the International Searching Authority dated Jun. 9, 2022, in PCT/US22/20226, filed Mar. 14, 2022, 17 pages.

International Search Report and Written Opinion of the International Searching Authority dated Jun. 9, 2022, in PCT/US22/20234, filed Mar. 14, 2022, 8 pages.

International Search Report and Written Opinion of the International Searching Authority dated Jun. 9, 2022, in PCT/US22/020254, filed Mar. 14, 2022, 8 pages.

International Search Report and Written Opinion of the International Searching Authority dated Jun. 3, 2022, in PCT/US22/020254, filed Mar. 14, 2022, 13 pages.

International Search Report and Written Opinion of the International Searching Authority dated Jun. 7, 2022, in PCT/US2022/022840, filed Mar. 31, 2022, 8 pages.

International Search Report and Written Opinion of the International Searching Authority dated Jul. 20, 2022, in PCT/US22/20263, filed Mar. 14, 2022, citing documents 1-5 therein, 9 pages.

International Search Report and Written Opinion of the International Searching Authority dated Aug. 1, 2022, in PCT/US22/20267, filed Mar. 14, 2022, citing documents 6-9 therein, 12 pages.

International Search Report and Written Opinion of the International Searching Authority dated Aug. 3, 2022, in PCT/US22/20215, filed Mar. 14, 2022, citing documents 10-12 therein, 10 pages.

International Search Report and Written Opinion of the International Searching Authority dated Jul. 7, 2022, in PCT/US22/20258, filed Mar. 14, 2022, citing documents 13-15 therein, 9 pages.

* cited by examiner

INTEGRATING DIGITAL CONTENT INTO DISPLAYED DATA ON AN APPLICATION LAYER VIA PROCESSING CIRCUITRY OF A SERVER

CROSS-REFERENCE TO RELATED APPLICATIONS

The present application claims priority to U.S. Provisional Application No. 63/249,120, filed Sep. 28, 2021, and U.S. Provisional Application No. 63/182,391, filed Apr. 30, 2021, the entire content of each of which is incorporated by reference herein in its entirety for all purposes.

BACKGROUND

Field of the Disclosure

The present disclosure relates to a method, device, and computer-readable medium of forming security air gaps between layers in a software stack, in particular where information is shared.

Description of the Related Art

Most software that runs on top of operating systems tends to take on the risk of the operating system potentially being compromised. If an operating system has been compromised from a security and threat level perspective, it is fair to assume that any software running on the device hosting the operating system is likely to be subject to some increased level of security and risk exposure due to the underlying operating system being compromised.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The present disclosure relates to a method including receiving, via processing circuitry of a server, a unique identifier having encoded data included in a reference patch embedded in displayed data received by an electronic device, the encoded data being decoded by the electronic device, the electronic device being instructed to display the displayed data in a first layer of the electronic device, the first layer being configured to display data of a first software application, the server being inaccessible by the first layer of the electronic device; identifying, via the processing circuitry of the server, an identity of a user based on the unique identifier of the reference patch embedded in the displayed data received by the electronic device in the first layer of the electronic device; determining, via the processing circuitry of the server, whether the user is authorized to receive secondary digital content corresponding to the user identity based on the unique identifier of the reference patch embedded in the displayed data received by the electronic device in the first layer of the electronic device; upon determining the user is authorized to receive the secondary digital content, transmitting, via the processing circuitry of the server, the secondary digital content to the electronic device; and instructing, via the processing circuitry of the server, the electronic device to display the secondary digital content in a second layer of the electronic device, the second layer of the electronic device being configured to display data of a second software application, the server being accessible by the second layer of the electronic device, the first layer of the electronic device being different from the second layer of the electronic device.

The present disclosure additionally relates to a device communicating with another device over a data communication network includes: processing circuitry configured to receive a unique identifier having encoded data included in a reference patch embedded in displayed data received by the another device, the encoded data being decoded by the another device, the another device being instructed to display the displayed data in a first layer of the another device, the first layer of the another device being configured to display data of a first software application, the device being inaccessible by the first layer of the another device; identify an identity of a user based on the unique identifier of the reference patch embedded in the displayed data received by the another device in the first layer of the another device; determine whether the user is authorized to receive secondary digital content corresponding to the user identity based on the unique identifier of the reference patch embedded in the displayed data received by the another device in the first layer of the another device; upon determining the user is authorized to receive the secondary digital content, transmit the secondary digital content to the another device; and instruct the another device to display the secondary digital content in a second layer of the another device, the second layer of the another device being configured to display data of a second software application, the device being accessible by the second layer of the another device, the first layer of the another device being different from the second layer of the another device.

The present disclosure additionally relates to a computer readable medium for storing computer-readable instructions that, when executed by a computer, cause the computer to perform a method, the method including: receiving, via processing circuitry of a server, a unique identifier having encoded data included in a reference patch embedded in displayed data received by an electronic device, the encoded data being decoded by the electronic device, the electronic device being instructed to display the displayed data in a first layer of the electronic device, the first layer being configured to display data of a first software application, the server being inaccessible by the first layer of the electronic device; identifying, via the processing circuitry of the server, an identity of a user based on the unique identifier of the reference patch embedded in the displayed data received by the electronic device in the first layer of the electronic device; determining, via the processing circuitry of the server, whether the user is authorized to receive secondary digital content corresponding to the user identity based on the unique identifier of the reference patch embedded in the displayed data received by the electronic device in the first layer of the electronic device; upon determining the user is authorized to receive the secondary digital content, transmitting, via the processing circuitry of the server, the secondary digital content to the electronic device; and instructing, via the processing circuitry of the server, the electronic device to display the secondary digital content in a second layer of the electronic device, the second layer of the electronic device being configured to display data of a second software application, the server being accessible by the second layer of the electronic device, the first layer of the electronic device being different from the second layer of the electronic device.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
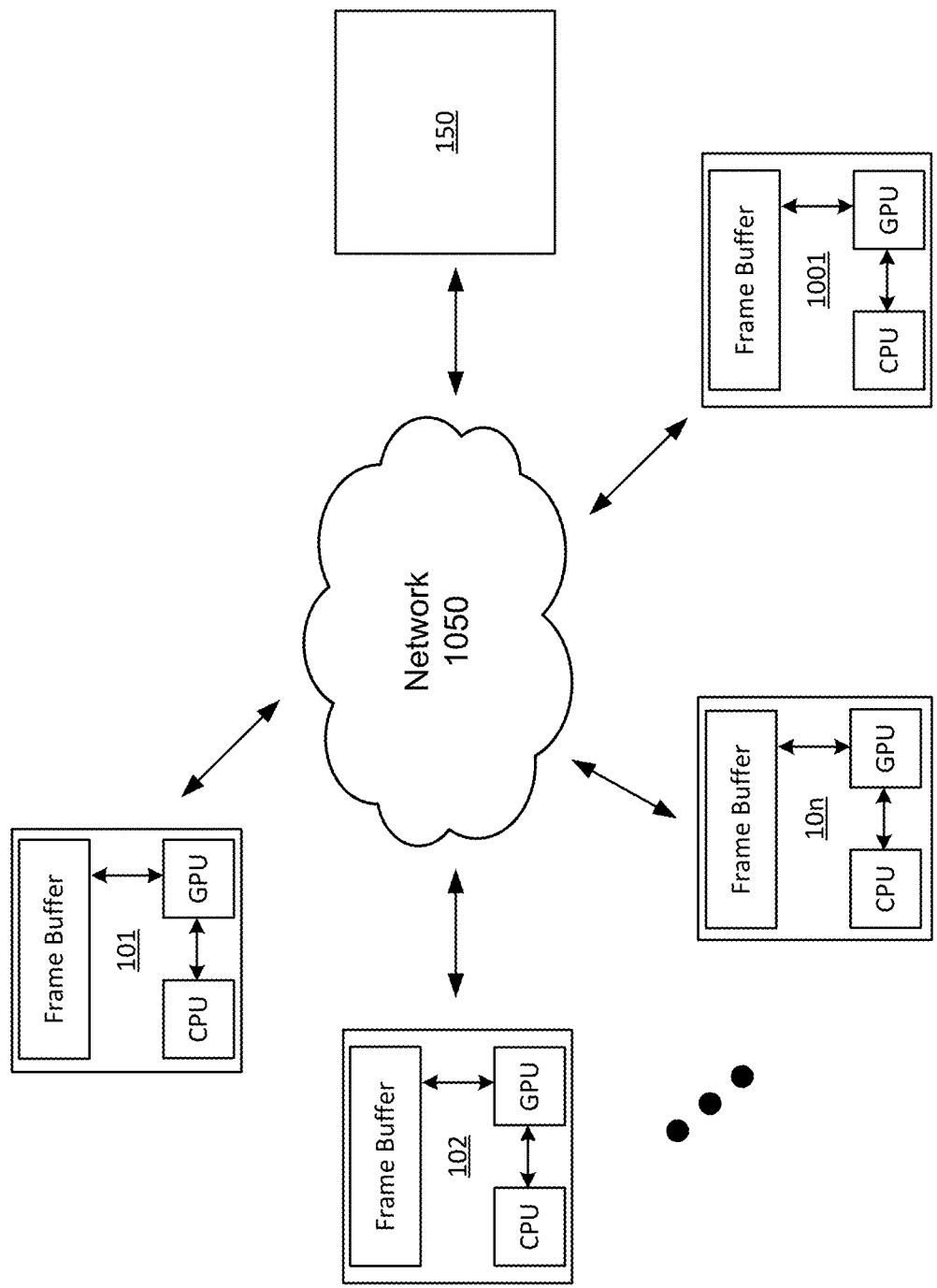
FIG. 1 is a schematic view of user devices communicatively connected to a server, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

A software application running on a device having an operating system (OS) can potentially be compromised, and vice versa. That is, in one scenario, the OS can be breached and thereby allow an attacker or hacker access to the application running on the OS. This can allow for the attacker to gain access to sensitive information being transmitted and received by the application. In one example, a security concern is the threat of Man-in-the-Middle (MITM) attacks, typically observed on Ethernet links by a hacker. MITM attacks may occur between a client, such as a user's desktop computer, and a switch, such as a server. Once a valid client connects to a switch, the hacker, who is located in the middle and is able to observe all the communications, is able to transmit and receive packets on the link as well. The hacker can insert new packets, modify packets, or re-send packets previously transmitted and captured on the link. In another example, the hacker can intercept communications between two users and their devices.

For these reasons, it can be advantageous for the application to constantly be poised in a defensive stance and assume a zero-trust policy with the OS. The application can implement a security strategy that isolates each layer of an application running on the OS from the OS and/or from other layers, thus providing a blast radius of n=1 at various layers in an implemented security stack. The layers can include functions, digital content, communication protocols, and/or data. That is, in the event there is a security threat area, and there is a security breach, the exposure (i.e. the blast radius) of the breach should be an n of 1. From a common nomenclature perspective, this means that if a password for the application is broken (or decoded, cracked, etc.), the hacker may only see what was behind that one password, and it gives the hacker no additional insights on how to break another password in use by the application. These passwords can provide access to, for example, data being received or transmitted by the device running the application. The application can, for instance, provide tailored information, data, or prompts to a user via a screen of the device. In one example, the user can be prompted to enter personal information into the prompts, such as bank account information, sensitive identification data, classified documentation, or the like. Thus, an application employing isolated data streams that are each individually protected with separate, unrelated encryption is desired.

Air gaps create isolation between protocols and layers of data. If the application is isolated from the OS, the personal information provided to the application will not be accessible by the OS, which provides protection in the event that the OS is compromised. Likewise, the application is able to process data (e.g., digital content) from the OS without directly receiving the data from the OS, thereby preventing malicious content in the OS from infecting the application. Furthermore, an isolated, layered approach to running an application on an OS using computer vision and similar techniques provides a seamless user experience wherein content stored and processed on the OS and content stored and processed on the application are visually indistinguishable.

According to an embodiment, the software application provides augmentation of a digital user experience. The augmentation may include an overlaying of digital objects onto a viewable display area of a display. The display may be a display of a mobile device such as a smartphone, tablet, and the like, a display of a desktop computer, or another interactive display. The digital objects may include text, images, videos, and other graphical elements, among others. The digital objects may be interactive. The digital objects may be associated with third-party software vendors.

In order to realize the augmentation of a digital user experience, a reference patch, that is a region of interest acting as an anchor, can be used. In one embodiment, the reference patch or other visually detectable element may serve to indicate a position at which digital content is to be placed onto a display. In some embodiments and as described herein, the reference patch may include encoded information that may be used to retrieve digital content and place that digital content into a desired location or locations in displayed data. The reference patch can be embedded within displayed data (such as, but not limited to, an image, a video, a document, a webpage, or any other application that may be displayed by an electronic device). The reference patch can include unique identifying data, a marker, or encoding corresponding to predetermined digital content. The reference patch can indicate to the electronic device the particular content that is to be displayed, the position at which the content is to be placed, and the size with which the content is to be displayed. Accordingly, when a portion of the displayed data including the reference patch is visible in a current frame of displayed data, the corresponding augmentation can be overlaid on the current frame of the displayed data wherein the augmentation includes secondary digital content (i.e., content that is secondary to (or comes after) the primary displayed data), herein referred to as "digital content," and/or digital objects. For example, an augmentation can include additional images to be displayed with the current frame of displayed data for a seamless visual experience.

Referring now to the figures, FIG. 1 is a schematic view of an electronic device, such as a client/user device (a first device 101) communicatively connected, via a network 1050, to a second electronic device, such as a server (a second device 150), and a generating device 1001, according to an embodiment of the present disclosure. Further, in an embodiment, additional client/user devices can be communicatively connected to both the first device 101 and the second device 150. A second client/user device (a third device 102) can be communicatively connected to the first device 101 and the second device 150. As shown, a plurality of the client/user devices can be communicatively connected to, for example, an Nth user device 10n.

An application may be installed or accessible on the first device 101 for executing the methods described herein. The application may also be integrated into the operating system of the first device 101. The first device 101 can be any electronic device such as, but not limited to, a personal computer, a tablet pc, a smart-phone, a smart-watch, an integrated AR/VR (Augmented Reality/Virtual Reality) headwear with the necessary computing and computer vision components installed (e.g., a central processing unit (CPU), a graphics processing unit (GPU), integrated graphics on the CPU, etc.), a smart-television, an interactive screen, a smart projector or a projected platform, an IoT (Internet of things) device or the like. The first device 101 can be a device including, but not limited to, components as described by FIG. 8.

Figure 8:
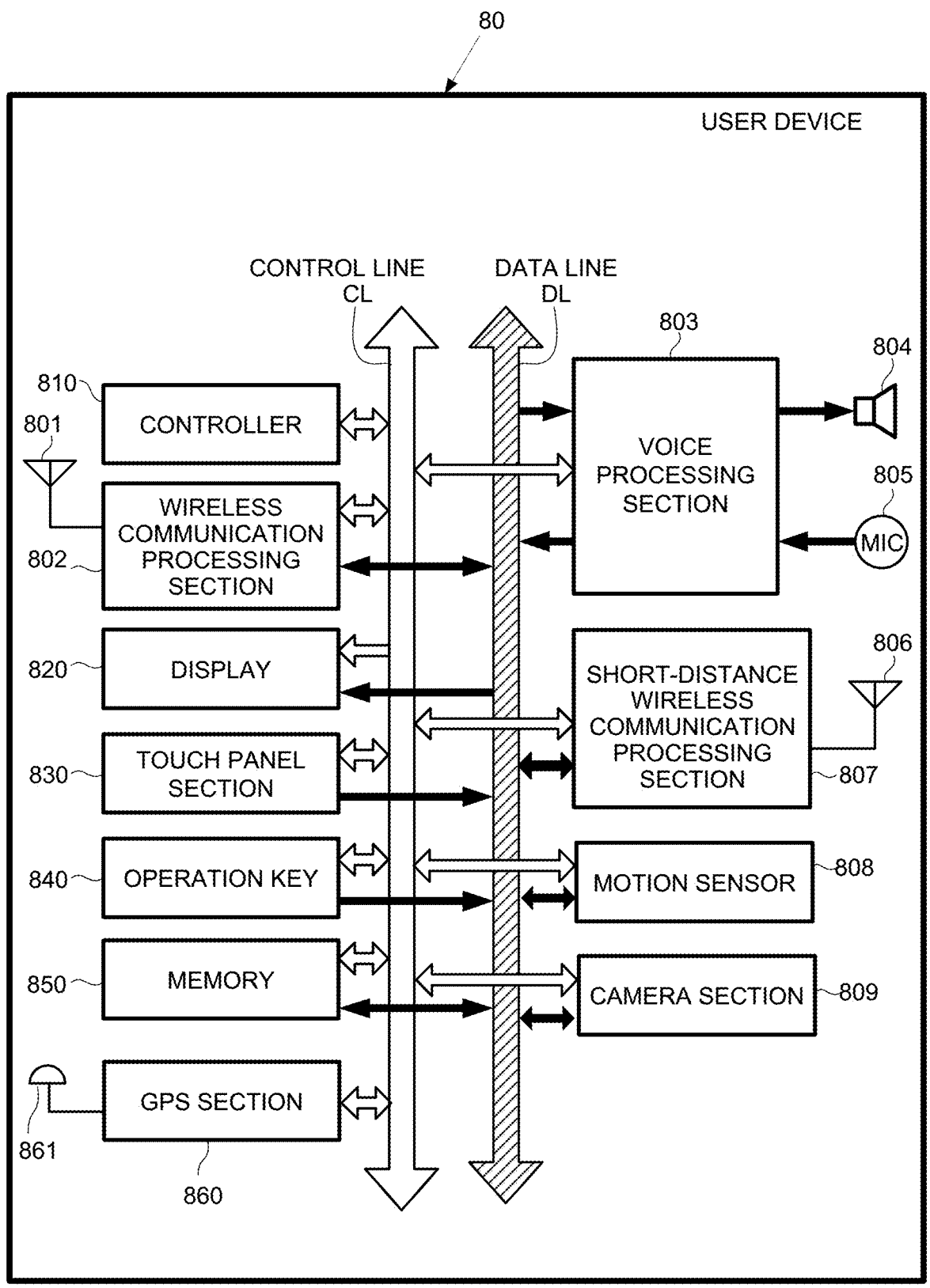
FIG. 8 is a schematic of a user device for performing a method, according to an exemplary embodiment of the present disclosure.
Figure 9:
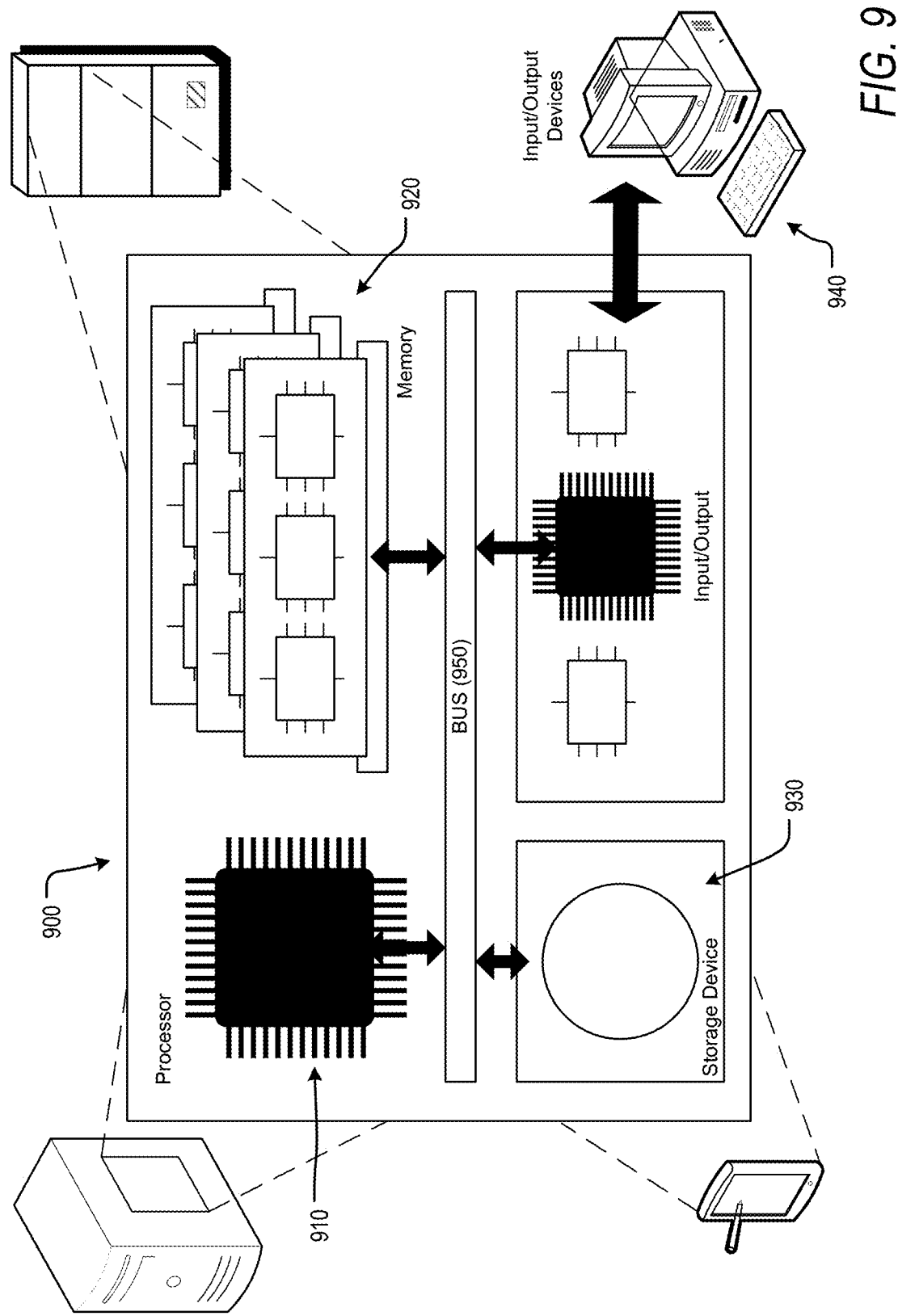
FIG. 9 is a schematic of a hardware system for performing a method, according to an exemplary embodiment of the present disclosure.
Figure 10:
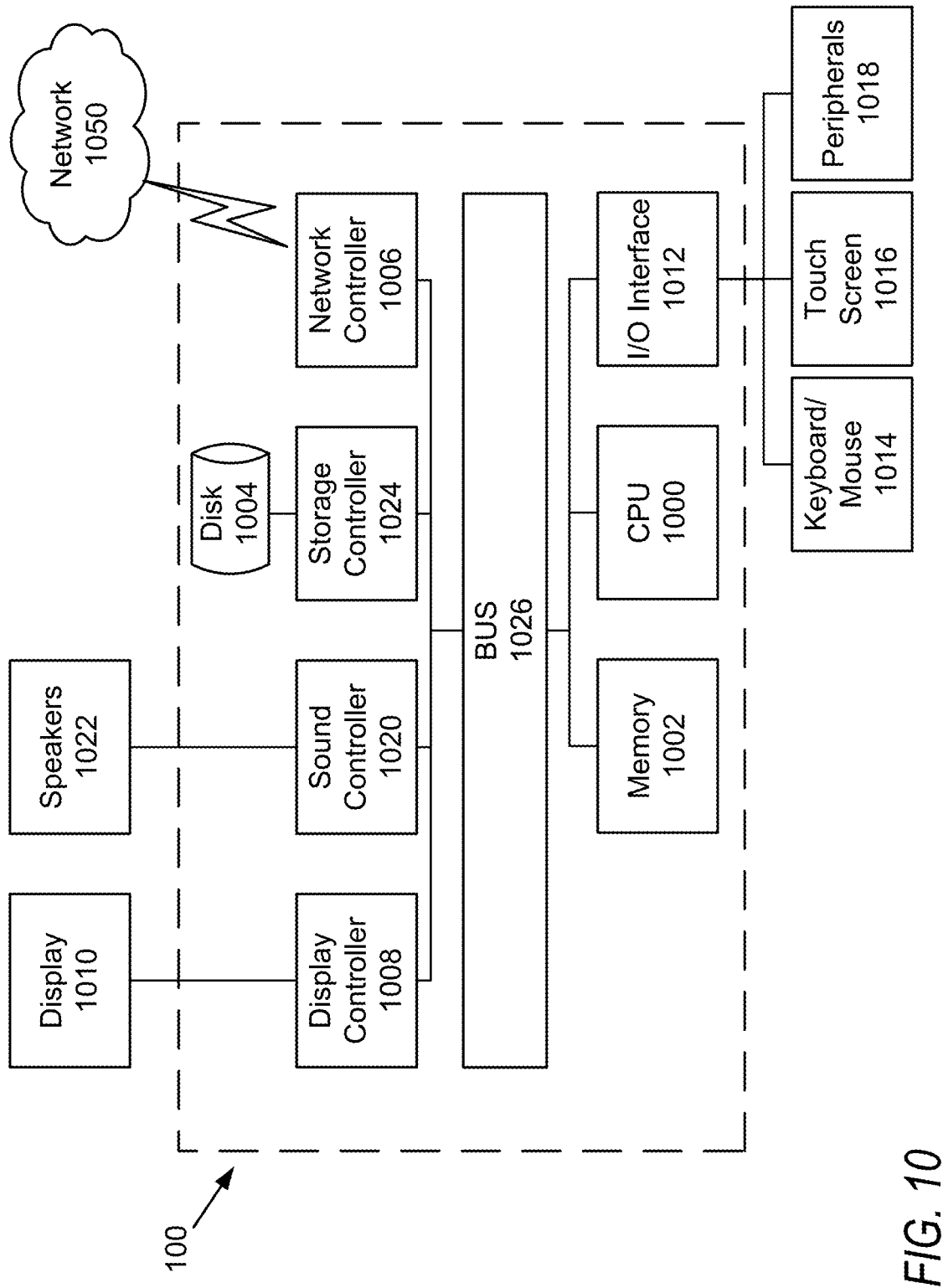
FIG. 10 is a schematic of a hardware configuration of a device for performing a method, according to an exemplary embodiment of the present disclosure.

As illustrated in FIG. 1, the first device 101 includes a CPU, a GPU, and a frame buffer, among other components (discussed in more detail in FIGS. 8-10). In an embodiment, the first device 101 can call graphics that are displayed on a display. The graphics of the first device 101 can be processed by the GPU and rendered in scenes stored on the frame buffer that is coupled to the display. The CPU can have an associated CPU memory and the GPU can have an associated video or GPU memory. The frame buffer may be an allocated area of the video memory. It can be understood that the CPU may have multiple cores or may itself be one of multiple processing cores in the first device 101. The CPU can execute commands in a CPU programming language such as C++. The GPU can execute commands in a GPU programming language such as HLSL. The GPU may also include multiple cores that are specialized for graphic processing tasks. Although the above description was discussed with respect to the first device 101, it is to be understood that the same description applies to the other devices (101, 102, 10n, and 1001) of FIG. 1. Although not illustrated in FIG. 1, the second device 150 can also include a CPU, GPU, and frame buffer.

Figure 2A:
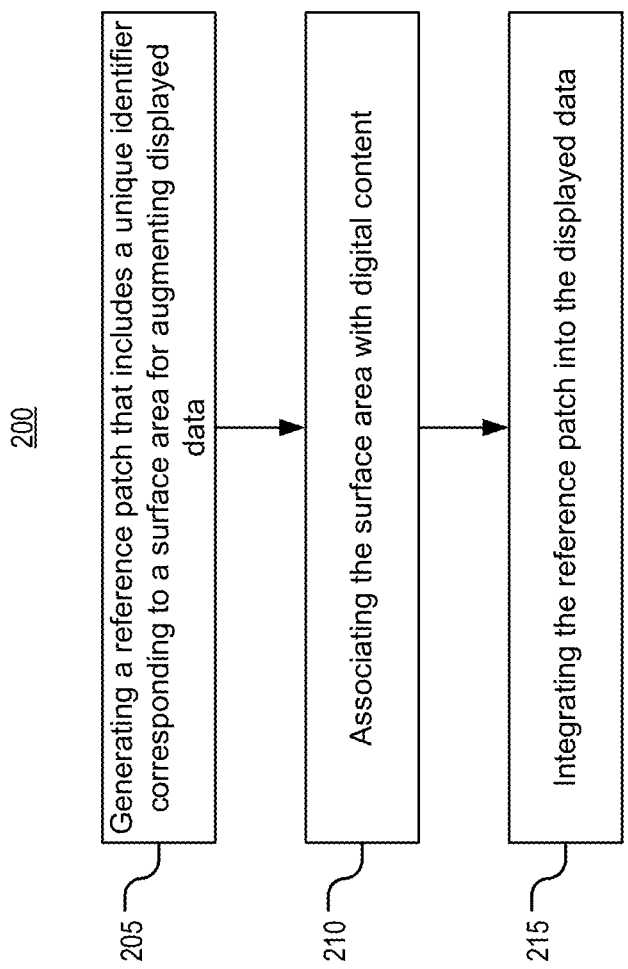
FIG. 2A is a flow chart for a method of generating a reference patch and embedding the reference patch into displayed data, according to an exemplary embodiment of the present disclosure.

FIG. 2A is a flow chart for a method 200 of generating a reference patch and embedding the reference patch into displayed data, according to an embodiment of the present disclosure. The present disclosure describes generation of the reference patch and embedding of this patch into the displayed data content in order to integrate additional content on the first device 101. In an embodiment, the first device 101 can incorporate digital content into what is already being displayed (displayed data) for a more immersive experience.

In this regard, the first device 101 can generate the reference patch in step 205. The reference patch can be an object having an area and shape that is embedded in the displayed data at a predetermined location in the displayed data. For example, the reference patch can be a square overlayed and disposed in a corner of a digital document (an example of displayed data), wherein the reference patch can be fixed to a predetermined page for a multi-page (or multi-slide) digital document. The reference patch can thus also represent a region of interest in the digital document. The reference patch can be an object that, when not in a field of view of the user, is inactive. The reference patch can, upon entering the field of view of the user, become active. For example, the reference patch can become active when detected by the first device 101 in the displayed data. When active, the reference patch can cause the detecting device to retrieve digital content and augment the displayed data by incorporating the retrieved digital content into the displayed data. Alternatively, the reference patch can become active when being initially located within the frame of the screen outputting the displayed data. For example, even if another window or popup is placed over top of the reference patch, the reference patch may continue to be active so long as the reference patch remains in the same location after detection and the window including the document incorporating the reference patch is not minimized or closed. As will be described further below, the reference patch can have a predetermined design that can be read by the first device 101, leading to the retrieval and displaying of the digital content.

In an embodiment, the first device 101 can use a geometrical shape for the reference patch for placement into any displayed data using applications executed in the first device 101. The reference patch can take any shape such as a circle, square, rectangle or any arbitrary shape. In step 210, the reference patch can also have predetermined areas within its shape for including predetermined data. The predetermined data can be, for example, unique identifiers that correspond to a surface area of the displayed data. The unique identifiers can be, for example, a marker. As will be described below, the marker can take the form of patterns, shapes, pixel arrangements, pixel luma, and pixel chroma, among others. The surface area, by way of the unique identifiers, can be associated with predetermined digital content that is recalled and displayed at the corresponding surface area in the displayed data. The unique identifier can include encoded data that identifies the digital content, a location address of the digital content at the second device 150 (see description below), a screen position within the surface area at which the digital content is insertable in the displayed data, and a size of the digital content when inserted in the displayed data (adjustable before being displayed).

That is, in an embodiment, the surface area (or an available area in which digital content is insertable/to be inserted) of the displayed data can be portion(s) of the displayed data that do not include objects that might obscure the reference patch or the digital content displayed at the corresponding surface area in the displayed data. For example, the first device 101 can use computer vision (described below) to detect the objects. For example, a slide in a slide deck can include text, pictures, logos, and other media, and the surface area can be the blank space or spaces around the aforementioned objects. Thus, the digital content can be displayed somewhere in the blank spaces. In an embodiment, the surface area of the displayed data can include portions of the displayed data that already include objects and the digital content can be displayed at the same location as the objects. For example, a slide in a slide deck can include a picture of a user, and the reference patch can be the area representing a face of the user and the digital content can be displayed at the same location as a body of the user. For example, a slide in a slide deck can include an image of a vehicle and the reference patch can be disposed in a blank space of the displayed data, while the digital content retrieved (e.g., a new car paint color and new rims) can be displayed over the image of the vehicle. In other words, the digital content may be placed in a blank area of the displayed data and/or in an area that is not blank (i.e., an area that includes text, image(s), video(s), etc.).

In step 215, the first device 101 can embed the reference patch into the displayed data, such as a word processing document file (i.e., DOC/DOCX) provided by e.g., Microsoft® Word, in a Portable Document Format (PDF) file such as the ones used by Adobe Acrobat®, in a Microsoft® PowerPoint presentation (PPT/PPTX), or in a video sequence file such as MPEG, MOV, AVI or the like. These file formats are illustrative of some file types which a user may be familiar with; however, applications included in the first device 101 are not limited to these types and other applications and their associated file types are possible.

The reference patch (or similar element) can be embedded into any displayed data, where the displayed data may be generated by an application running on or being executed by the first device 101. The reference patch can encompass the whole area designated by the displayed data, or just a portion of the area designated by the displayed data. The method of generating the reference patch and embedding the reference patch into the displayed data has been described as being performed by the first device 101, however, the second device 150 can instead perform the same functions. In order to be detected in the displayed data on the first device 101, the reference patch may only be simply displayed as an image on the screen. The reference patch may also simply be a raster image or in the background of an image. The reference patch is also able to be read even when the image containing the reference patch is low resolution. Because the reference patch is encoded in a hardy and enduring manner such that even if a portion of the reference patch is corrupted or undecipherable, the reference patch can still be activated and used.

In an embodiment, the reference patch can be embedded inside of a body of an email correspondence. The user can use any electronic mail application such as Microsoft Outlook®, Gmail®, Yahoo®, etcetera. As the application is running on the first device 101, it allows the user to interact with other applications. In an embodiment, the reference patch can be embedded on a video streaming or two-way communication interface such as a Skype® video call or a Zoom® video call, among others. In an embodiment, the reference patch can be embedded in displayed data for multi-party communication on a live streaming interface such as Twitch®.

One way in which the first device 101 may embed the reference patch into the displayed data is by arranging the generated reference patch in the displayed data such as in a desired document or other media. The reference patch may include a facade of the digital content which becomes an integrated part of the displayed data. The facade can act as a visual preview to inform the user of the digital content linked to the reference patch. The facade can include, for example, a screenshot of a video to be played, a logo, an animation, or an image thumbnail, among others. The facade can be a design overlay. The design overlay can be a picture that represents the underlying digital content superimposed over the reference patch. In an embodiment, the facade can indicate the content that is represented by the reference patch. The facade can be contained within the shape of the reference patch or have a dynamic size. For example, attention of the user can be brought to the facade by adjusting the size of the facade when the reference patch is displayed on the display. The adjustment of the size of the facade can also be dynamic, wherein the facade can enlarge and shrink multiple times. By the same token, a position and rotation of the facade can also be adjusted to produce a shaking or spinning effect, for instance.

Unlike traditional means of sending displayed data, the first device 101 may not send the whole digital content with a header file (metadata) and a payload (data). Instead, the reference patch that may include a facade of the underlying digital content is placed within the displayed data. If a facade is used, it indicates to the first device 101 that the surface area can have digital content that can be accessed with selection (clicking with a mouse, touchpad, eye-gaze, eye-blinks, or via voice-command) of the facade. The digital content can also be accessed or activated automatically, e.g., when the user has the reference patch displayed on the display of the first device 101. Other symbolic means of visualization can be employed to indicate to the user that the surface area is likely to include information for obtaining digital content. For example, a highlighting effect can be applied along a perimeter of the reference patch in a pulsating pattern of highlighting intensity to bring attention to the presence of the reference patch. For example, a series of spaced dashes surrounding the reference patch and oriented perpendicular to the perimeter of the reference patch can appear and disappear to provide a flashing effect. Other means can be employed to indicate to the user that the surface area is likely to include information for obtaining digital content, such as an audio cue.

The first device 101 employs further processes before embedding the reference patch into the displayed data. These processes and schemas are further discussed in FIG. 2B.

Figure 2B:
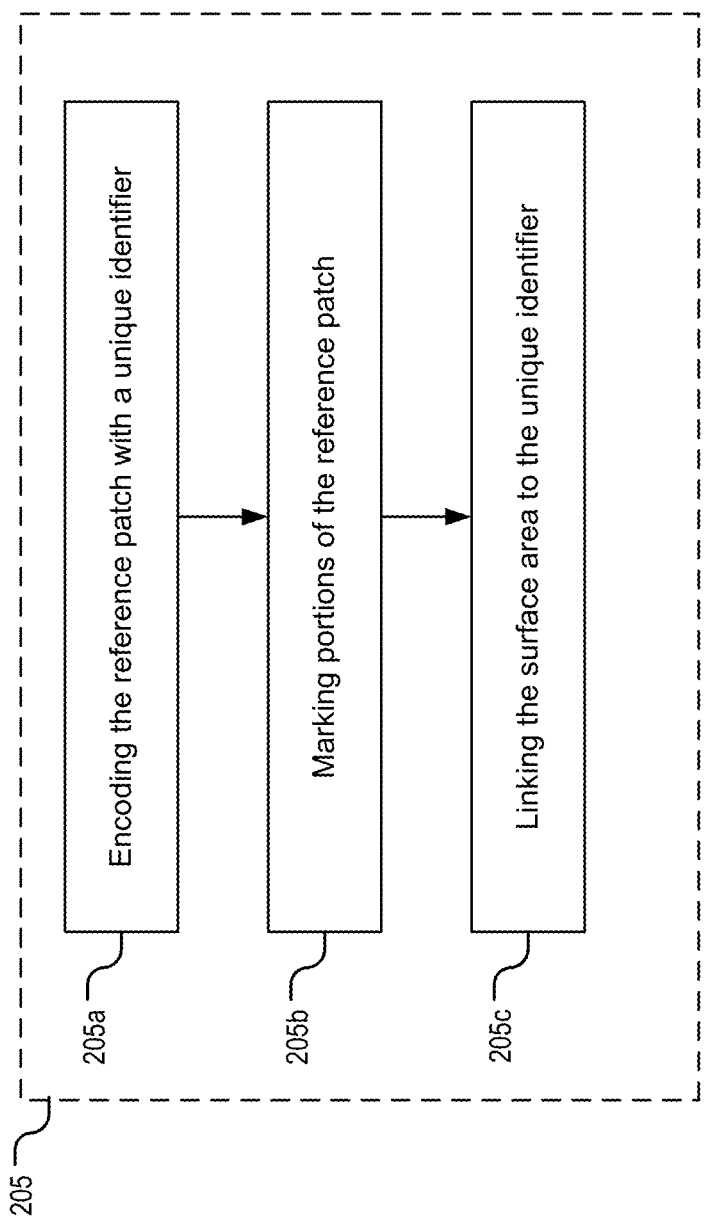
FIG. 2B is a flow chart of a sub-method of generating the reference patch, according to an exemplary embodiment of the present disclosure.

FIG. 2B is a flow chart of a sub-method of generating the reference patch, according to an embodiment of the present disclosure. The first device 101 can associate the digital content with the surface area corresponding to the reference patch (e.g., via the unique identifiers included therein) generated by the first device 101. In an embodiment, the surface area may encompass the whole of the displayed data or a portion of it.

The reference patch, which includes the unique identifiers corresponding to the surface area associated with the digital content, is then embedded into the displayed data by the first device 101. In some use cases, the displayed data including the reference patch can be sent or transmitted to a second user having the third device 102 including the same application, which then allows the second user to access information within the surface area and obtain the digital content and have it viewable on the third device 102. That is, the third device 102 can have the same displayed data overlaid with the augmenting digital content on the surface area of the display of the third device 102 in the location or locations defined by the reference patch.

In FIG. 2B, the generating device 1001 uses additional processes to effectuate generation of the reference patch which is obtained and embedded by the first device 101. In an embodiment, the generating device 1001 encodes the reference patch with the unique identifiers corresponding to the surface area in step 205a. The generating device 1001 can mark areas of the reference patch in step 205b to form the marker that, either separately or in combination, define or may be used to access the unique identifiers. The marker can take the form of patterns, shapes, pixel arrangements, or the like. In an example, the marker can have a shape that corresponds to the shape of the surface area. In an example, the marker can have a size that corresponds to the size of the surface area. In an example, the marker can have a perimeter that corresponds to the perimeter of the surface area. The marker can use any feasible schema to provide identifying information that corresponds to the surface area within parts of the displayed data. In an embodiment, the marker can incorporate hidden watermarks that are only detectable by the first device 101 and the third device 102, which have detection functionality implemented therein, for example having the application installed or the functionality built into the operating system.

The marker can incorporate patterns which can then be extracted by the first device 101. In an example, the first device 101 can perform the embedding, then send the digital content having the embedded reference patch to the third device 102. The encoding is performed by the generating device 1001 and may use any variety of encoding technologies such as the ArUco algorithm to encode the reference patch by marking the reference patch with the marker. The first device 101 may also be used as the generating device 1001.

In an embodiment, the marker can be comprised of a set of points, equidistant from each other and/or some angle apart from a reference point, such as the center of the reference patch or represent some other fiducial points. That is, the fiducial points corresponding to the marker can provide a set of fixed coordinates or landmarks within the digital content with which the surface area can be mapped relative to the fiducial points. In an embodiment, the marker can be comprised of a set of unique shapes, wherein predetermined combinations of the unique shapes can correspond to a target surface area (or available area, or areas) for displaying the displayed data. The predetermined combinations of the unique shapes can also correspond to predetermined digital content for displaying in the surface area. The predetermined combinations of the unique shapes can also correspond to/indicate a position/location where the digital content should be displayed at the surface area relative to a portion of the surface area. A combination of the set of points and unique identifiers can be used as well.

For example, the unique identifiers can be unique shapes that correlate to predetermined digital content as well as indicating where the digital content should be overlayed on the display (the screen position) relative to a set of points marked on the reference patch. The unique identifiers can also indicate a size of the digital content to be overlayed on the display, which can be adjustable based on the size of the surface area (also adjustable) and/or the size of the display of the first device 101. The unique identifiers can be relatively invisible or undetectable to the user, but readable by the first device 101 and cover predetermined areas of the reference patch. The unique identifiers, and by extension, the marker, can have an appearance that is marginally different from an appearance of the area of the reference patch. For example, the area of the reference patch can appear white to the user and the unique identifiers can also appear white to the user but may actually have a slightly darker pixel color that can be detected and interpreted by a device, such as the first device 101. For instance, the appearance of the unique identifiers can be 0.75% darker than the white color of the area of the reference patch. Such a small difference can be identified and discerned by the first device 101 while being substantially imperceptible to the user.

In an embodiment, the area of the reference patch can be divided into predetermined shapes, for instance a set of squares, and within each square, the marker (such as a "letter") can be included. For example, there can be 16 squares. Furthermore, subsets of the set of squares can be designated to represent varying information, such as a timestamp corresponding to 8 of the squares, a domain corresponding to 5 of the squares, a version corresponding to 1 of the squares, and additional information corresponding to a remainder of the squares. An identification based on the set of squares can be, for example, an 18-character (or "letter") hexadecimal. The set of squares can further include additional subsets for a randomization factor, which can be used for calculating a sha256 hash prior to encoding the reference patch with the hash. Together, the set of squares having the marker included therein can comprise the unique identifiers.

Moreover, the generating device 1001 can also employ chroma subsampling to mark attributes represented by a particular pattern. In an embodiment, the generating device 1001 can mark parts of the reference patch with predetermined patterns of pixel luma and chroma manipulation that represent a shape, a size, or a position of the surface area for displaying the digital content. Moreover, the generating device 1001 can mark a perimeter of the reference patch with a predetermined edging pattern of pixel luma and chroma manipulation that represents a perimeter of the surface area for displaying the digital content.

The generating device 1001 can further link the surface area with unique identifiers in step 205c. The unique identifiers can be hashed values (such as those described above) that are generated by the generating device 1001 when the reference patch is generated (such as the one having the area of the reference patch divided into the subset of squares).

Figure 2C:
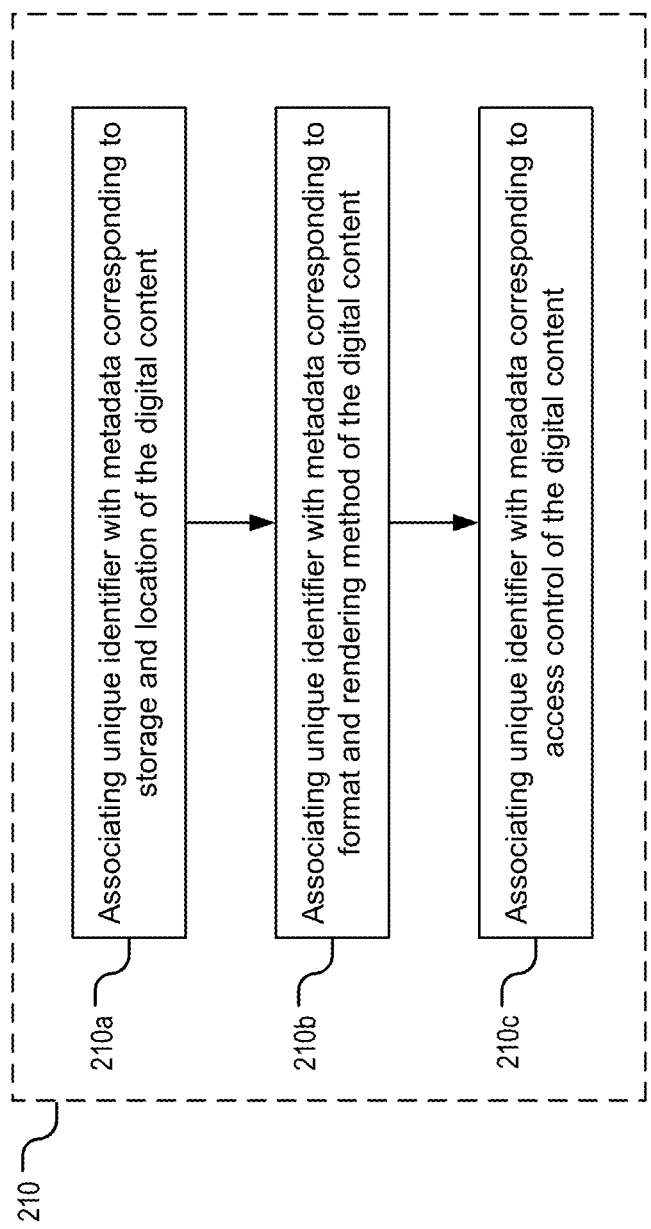
FIG. 2C is a flow chart of a sub-method of associating a surface area with digital content, according to an exemplary embodiment of the present disclosure.

FIG. 2C is a flow chart of a sub-method of associating the surface area with digital content, according to an embodiment of the present disclosure. In FIG. 2C, the generating device 1001 uses additional processes to associate the surface area with digital content. In an embodiment, the generating device 1001 can associate the unique identifiers corresponding to the surface area with metadata. In step 210a, the unique identifiers can be associated with metadata embodying information about the storage and location of the digital content. Moreover, in step 210b, the generating device 1001 can associate the unique identifier of the surface area with metadata which embodies information about the format and rendering information used for the digital content. In step 210c, the generating device 1001 can associate the unique identifiers of the surface area with metadata which embodies access control information of the digital content.

In an embodiment, the storage of the digital content can be on a remote server, such as the second device 150, and the location of the digital content can be the location address of the memory upon which it is stored at the remote server. The storage and location of the digital content are thus linked with the metadata that can point to where the digital content can later be obtained from. The digital content is not embedded into the displayed data. In an embodiment, the format and rendering information about the digital content is embodied in the metadata and associated with the unique identifiers. This information is helpful when the first device 101 or the third device 102 are on the receiving end of the transmitted displayed data and need to properly retrieve and process the digital content.

Moreover, in an embodiment, the access control of the digital content can also be encompassed in the metadata and associated with the unique identifiers corresponding to the surface area. The access control can be information defining whether the digital content can be accessed by certain individuals or within a certain geographical location. The access control information can define restrictions such as those placed upon time and date as to when and how long the digital content can be accessed. The access control information can define the type of display reserved for access by the first device 101. For example, a user may wish to restrict access to the digital content to certain types of devices, such as smartphone or tablets. Thus, the metadata defining a display requirement would encompass such an access control parameter.

Figure 2D:
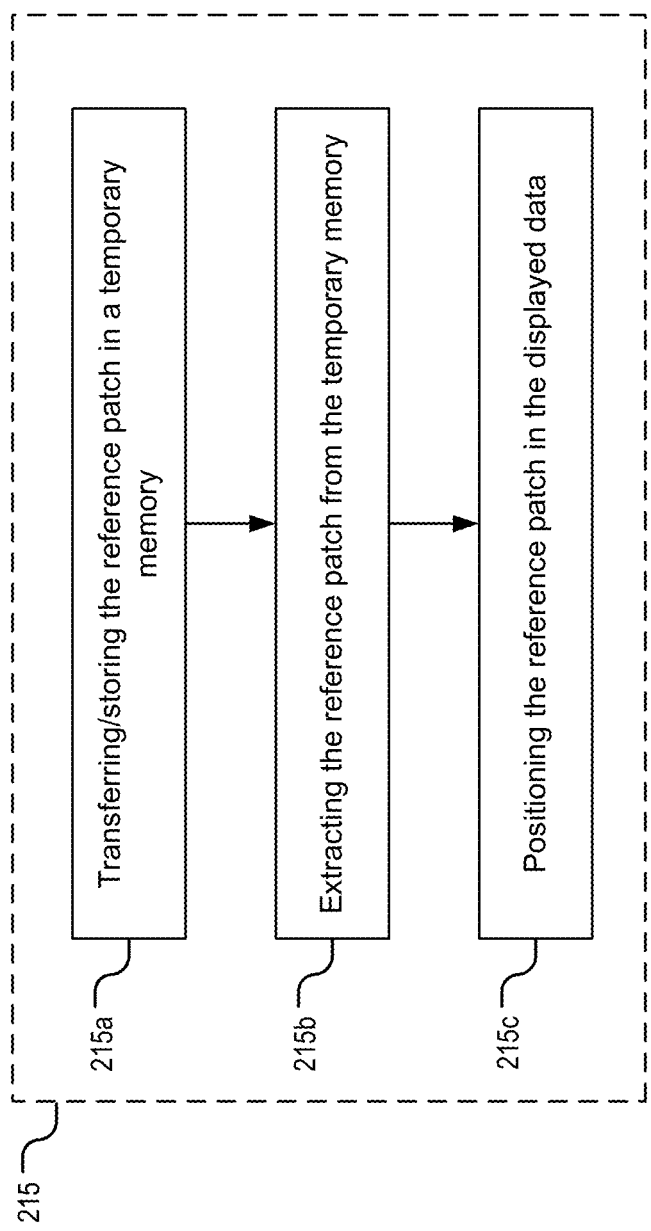
FIG. 2D is a flow chart of a sub-method of integrating the reference patch into the displayed data, according to an exemplary embodiment of the present disclosure.

FIG. 2D is a flow chart of a sub-method of integrating the reference patch into the displayed data, according to an embodiment of the present disclosure. In FIG. 2D, the generating device 1001 uses additional processes to effectuate integration of the reference patch into the displayed data. In an embodiment, the generating device 1001 can temporarily transfer or store the reference patch in a storage of the first device 101 in step 215a. The storage can be accessed by the first device 101 for embedding the reference patch into the displayed data at any time. The first device 101 can extract the reference patch from the storage for embedding purposes in step 215b. The first device 101 can also arrange the reference patch at a predetermined location and with a predetermined reference patch size in step 215c. The first device 101 can further embed the reference patch such that a document, for example, having the reference patch embedded therein can be sent to a recipient, for example the second user using the third device 102, where he/she can access the document using the application on the third device 102 as further described below. Again, the features of the generating device 1001 can be performed by the first device 101.

The displayed data can be output from a streaming application or a communication application with a data stream having the reference patch embedded therein. The actual digital content may not be sent along with the underlying displayed data or data stream, but only the unique identifier and/or a facade of the digital content is sent. The unique identifier and/or the underlying metadata can be stored in a cloud-based database such as MySQL which can point to the second device 150 or a cloud-based file hosting platform that ultimately houses the digital content. No limitation is to be taken with the order of the operation discussed herein; such that the sub-methods performed by the first device 101 can be carried out synchronous to one another, asynchronous, dependently or independently of one another, or in any combination. These stages can also be carried out in serial or in parallel fashion.

Figure 3A:
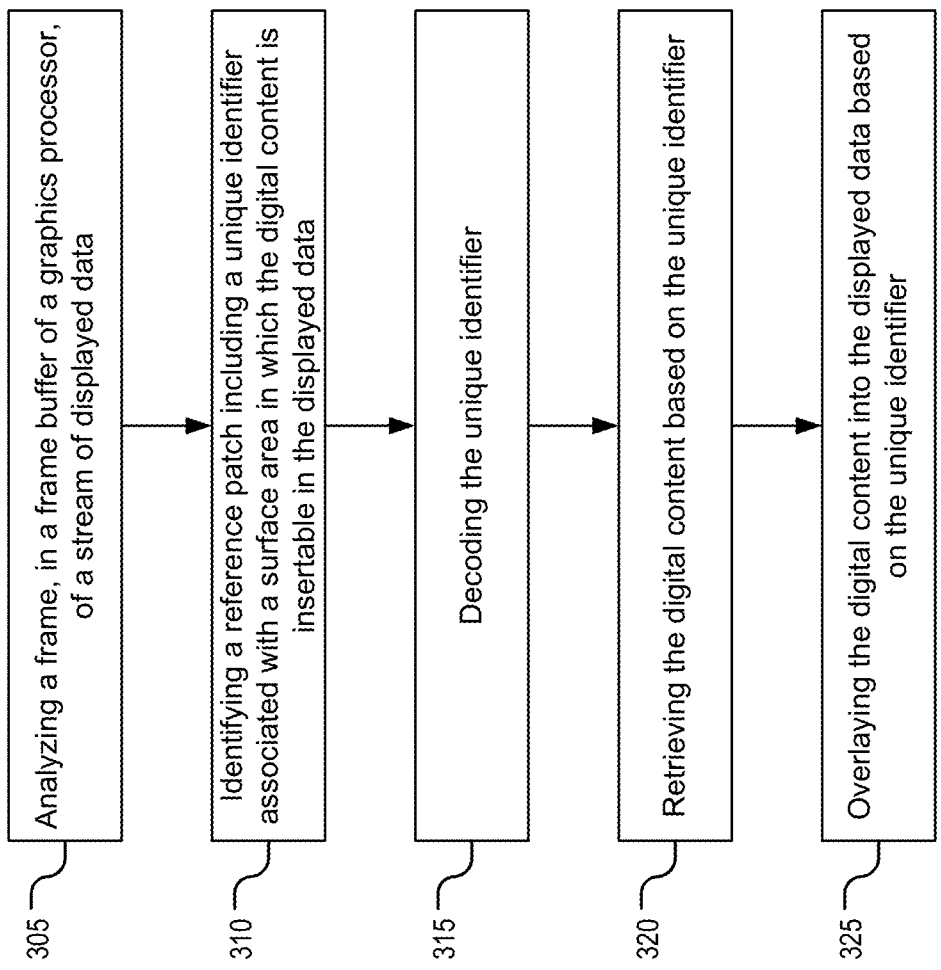
FIG. 3A is a flow chart for a method of inspecting the reference patch, according to an exemplary embodiment of the present disclosure.

FIG. 3A is a flow chart for a method 300 of identifying the reference patch included in the displayed data and overlaying the digital content into displayed data, according to an embodiment of the present disclosure. In an embodiment, in step 305, the first device 101 can inspect and analyze the stream of data being outputted by the first device's 101 video or graphics card and onto the display of the first device 101. That is, the first device 101 can access a frame buffer of the GPU and analyze, frame by frame, in the frame buffer, the outputted stream of data which can include the displayed data. In an embodiment, a frame represents a section of the stream of the displayed data that is being displayed by the first device 101. In that regard, the first device 101 can inspect the outputted stream of data. The first device 101 can achieve this by intercepting and capturing data produced from the first device 101's video card or GPU that is communicated to the first device 101's display.

In an embodiment, in step 310, the first device 101 can process attributes of each pixel included in a single frame and detect groups of pixels within that frame, which may have a known predetermined pattern of pixel luma and chroma manipulation, in order to find the reference patch.

The inspected frame by frame stream of data is also used by the first device 101 to identify the reference patch which includes the unique identifiers therein. In an embodiment, the first device 101 employs pattern recognition algorithms to detect and identify the reference patch, the perimeter of the reference patch, and/or the area of the reference patch. In an embodiment, the first device 101 detects and identifies the reference patch via the marker itself. A variety of pattern recognition algorithms can be used, such as Artificial Neural Networks (ANN), Generative Adversarial Networks (GAN), thresholding, SVM (Support Vector Machines) or any classification and pattern recognition algorithm available conducive to computer vision. Computer vision techniques may be artificial intelligence techniques that train computers to interpret and understand a visual world. In an example, the computer vision techniques may be an image recognition task, a semantic segmentation task, and the like. In a non-limiting example, the processor-based computer vision operation can include sequences of filtering operations, with each sequential filtering stage acting upon the output of the previous filtering stage. For instance, when the processor (processing circuitry) is/includes a GPU, these filtering operations are carried out by fragment programs.

In another example, the computer vision techniques may be a processor-based computer vision technique. In an embodiment, the first device 101 can look for predetermined or repeatable patterns within the frame which indicates the presence of the reference patch. In an embodiment, the first device 101 can identify the reference patch based on a confidence level, the confidence level being high when the predetermined pattern of pixel luma and chroma manipulation and the predetermined edging pattern of pixel luma and chroma manipulation are detected in the reference patch. The confidence level can be lower when one or neither of the predetermined patterns is/are detected.

According to an embodiment, in the event that an input to the operation is an image, the input images can be initialized as textures and then mapped onto quadrilaterals. By displaying these quadrilaterals in appropriately sized windows, a one-to-one correspondence of image pixels to output fragments can be ensured. Similarly, when the input to the operation is an encoded image, a decoding process may be integrated into the processing steps described above. A complete computer vision algorithm can be created by implementing sequences of these filtering operations. After the texture has been filtered by the fragment program, the resulting image is placed into texture memory, either by using render-to-texture extensions or by copying the frame buffer into texture memory. In this way, the output image becomes the input texture to the next fragment program. This creates a pipeline that facilitates the entire computer vision algorithm. However, often a complete vision algorithm may require operations beyond filtering. For example, summations are common operations. Furthermore, more-generalized calculations, such as feature tracking, can also be mapped effectively onto graphics hardware.

In an embodiment, the reference patch can be identified by use of edge detection methods. In particular, edge detection can be used for the perimeter of the reference patch having a predetermined pattern (the predetermined edging pattern). In an example, the edge detection method may be a Canny edge detector. The Canny edge detector may run on the GPU. In one instance, the Canny edge detector can be implemented as a series of fragment programs, each performing a step of the algorithm.

In an embodiment, the identified reference patch can be tracked from frame to frame using feature vectors. Calculating feature vectors at detected feature points is an operation in computer vision. A feature in an image is a local area around a point with some higher-than-average amount of uniqueness. This makes the point easier to recognize in subsequent frames of video. The uniqueness of the point is characterized by computing a feature vector for each feature point. Feature vectors can be used to recognize the same point in different images and can be extended to more generalized object recognition techniques.

Feature detection can be achieved using methods similar to the Canny edge detector that instead search for corners rather than lines. If the feature points are being detected using sequences of filtering, the GPU can perform the filtering and read back to the CPU a buffer that flags which pixels are feature points. The CPU can then quickly scan the buffer to locate each of the feature points, creating a list of image locations at which feature vectors on the GPU will be calculated.

In step 315, the first device 101 can decode the encoded data of the unique identifiers from the area of the reference patch, wherein the unique identifiers correspond to the surface area. The unique identifiers can be hashed values that could have been generated beforehand by the first device 101.

In step 320, the first device 101 can use the unique identifiers to link the surface area with the digital content using metadata and retrieve the digital content based on the unique identifiers.

In step 325, the first device 101 can overlay the digital content onto the surface area of the displayed data based on the unique identifiers.

Again, the method of identifying the reference patch included in the displayed data and augmenting the displayed data is described as performed by the first device 101, however, the second device 150 can instead perform the same functions.

Figure 3B:
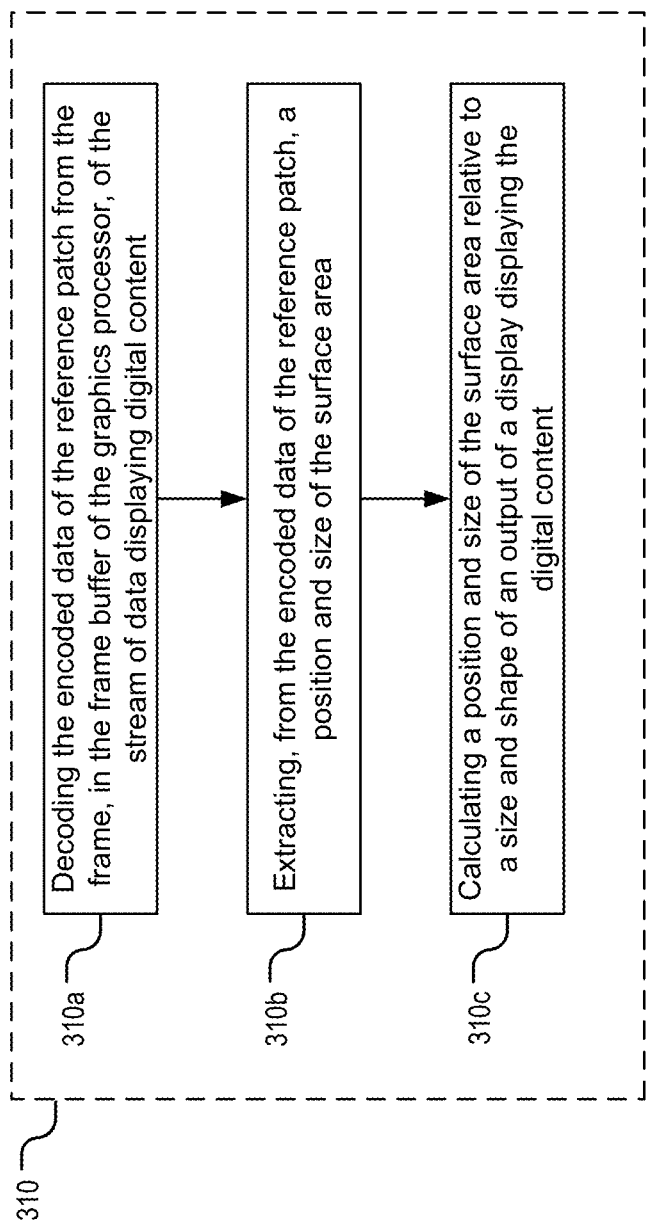
FIG. 3B is a flow chart of a sub-method of identifying the reference patch with unique identifiers corresponding to the surface area from the stream of data, according to an exemplary embodiment of the present disclosure.

In an embodiment, the first device 101 identifies the surface area corresponding to the reference patch by employing further processes to process the frames. To this end, FIG. 3B is a flow chart of a sub-method of identifying the reference patch with the unique identifiers corresponding to the surface area from the stream of data, according to an embodiment of the present disclosure.

In step 310a, the first device 101 can decode the encoded reference patch from the frame. The encoded reference patch can include the marker that makes up the unique identifiers within the reference patch incorporated previously. The reference patch can also include other identifying information. The marker can be disposed within the reference patch, such as within the area of the reference patch or along a perimeter of the reference patch, or alternatively, outside of the area of the reference patch.

Whatever schema is used to encode the marker in the reference patch is also used in reverse operation to decode the underlying information contained within the reference patch. As stated above, in an embodiment, the encoded marker can be patterns generated and decoded using the ArUco algorithm or by other algorithms that encode data according to a predetermined approach.

In step 310b, the first device 101 can also extract attributes of the surface area from the reference patch. In an embodiment, the position, size, shape, and perimeter of the surface area can be extracted, although other parameters can be extracted as well. Other parameters include boundary lines, area, angle, depth of field, distance, ratio of pairs of points, or the like. In an embodiment, where shape and perimeter are designated as the attributes, the first device 101 can make determinations of size, shape, and perimeter and output that result. Specifically, the size or shape of the surface area can be determined by evaluating a predetermined or repeatable pattern of pixel luma and chroma manipulation in the reference patch. The predetermined pattern can be marked on, within the area, or outside of the area of the reference patch. The predetermined pattern can correspond to the size or shape of the surface area. The predetermined pattern can correspond to the size or shape of the digital content. The perimeter of the surface area can also be determined by evaluating a predetermined edging pattern of pixel luma and chroma manipulation. The predetermined edging pattern can be marked on, within the area, or outside of the area of the reference patch. That is, the predetermined edging pattern of the reference patch can correspond to the perimeter of the surface area. The predetermined edging pattern of the reference patch can correspond to the perimeter of the digital content.

In step 310c, the first device 101 can also calculate a position and size of the surface area relative to the size and shape (dimensions) of the output signal from the display that is displaying the displayed data. In an embodiment, the calculating of the size, relative to the size and shape of the outputted signal from the display, includes determining the size of the surface area by inspecting a furthest measured distance between the edges of the surface area. Furthermore, the calculating of a location of the surface area, relative to the size and shape of the outputted signal from the display, includes determining the location of the surface area relative to the size and shape of the displayed data outputted through the display. This includes calculating the distance between the outer edges of the surface area and the inner edges of the displayed data being outputted by the display. The determined size and location of the surface area can be outputted as a result. Notably, prior to overlaying the digital content into the displayed data, the first device 101 can adjust, based on the predetermined pattern and the predetermined edging pattern, the size and perimeter of the digital content for displaying in the display of the first device 101. For example, the size and perimeter of the digital content for displaying in the display of the first device 101 can be scaled based on the size and perimeter of the surface area and/or the size of the display.

The first device 101 can provide information regarding the characteristics of the output video signal, such that the digital content that is later overlaid can correctly be displayed to account for various manipulations or transformations that may take place due to hardware constraints, user interaction, image degradation, or application intervention. Such manipulations and transformations may be the relocation, resizing, and scaling of the reference patch and/or the surface area, although the manipulations and transformations are not limited to those enumerated herein.

In an embodiment, the reference patch itself can be used as the reference for which the digital content is displayed on the surface area. In one example, the location at which to display the digital content in the surface area can be determined relative to the location of the reference patch on the displayed data. In one example, the size of the surface area can be determined relative to the size of the reference patch on the displayed data. In an example employing a combination of the two properties of the reference patch, the reference patch displayed in the displayed data on a smart phone having a predetermined size and a surface area can be scaled relative to the predetermined size of the display of the smart phone. This can be further adjusted when the reference patch in the same displayed data is displayed on a desktop monitor, such that the predetermined size of the reference patch in the displayed data displayed on the desktop monitor is larger and thus the size of the surface area can be scaled to be larger as well. Furthermore, the location of the surface area can be determined via a function of the predetermined size of the reference patch. For example, the location at which to display the digital content in the surface area can be disposed some multiple widths laterally away from the location of the reference patch as well as some multiple heights longitudinally away from the location of the reference patch. As such, the predetermined size of the reference patch can be a function of the size of the display of the first device 101. For example, the predetermined size of the reference patch can be a percentage of the width and height of the display, and thus the location and the size of the surface area are also a function of the width and height of the display of the first device 101.

In an embodiment, the first device 101 can determine an alternative location at which to display the digital content based on behaviors of the user. For example, the first device 101 can compare the encoded data corresponding to the location at which to display the digital content in the surface area to training data describing movement and focus of the user's eyes while viewing the displayed data. Upon determining the location at which to display the digital content in the surface area (as encoded in the reference patch) is not the same as the training data, the first device 101 can instead display the digital content at the location described by the training data as being where the user's eyes are focused in the displayed data at a particular time. For example, the user's eyes may be predisposed to viewing a bottom-right of a slide in a slide deck. The first device 101 can decode the reference patch and determine the digital content is to be displayed in a bottom-left of the slide deck. The training data can indicate that, for example, the user's eyes only focus on the bottom-left of the slide 10% of the time, while user's eyes focus on the bottom-right of the slide 75% of the time. Thus, the first device 101 can then display the digital content in the bottom-right of the slide instead of the bottom-left. The training data can also be based on more than one user, such as a test population viewing a draft of the slide deck. For example, the training data can be based on multiple presentations of the slide deck given to multiple audiences, wherein eye tracking software determines the average location of the audience's focus on each of the slides.

Figure 3C:
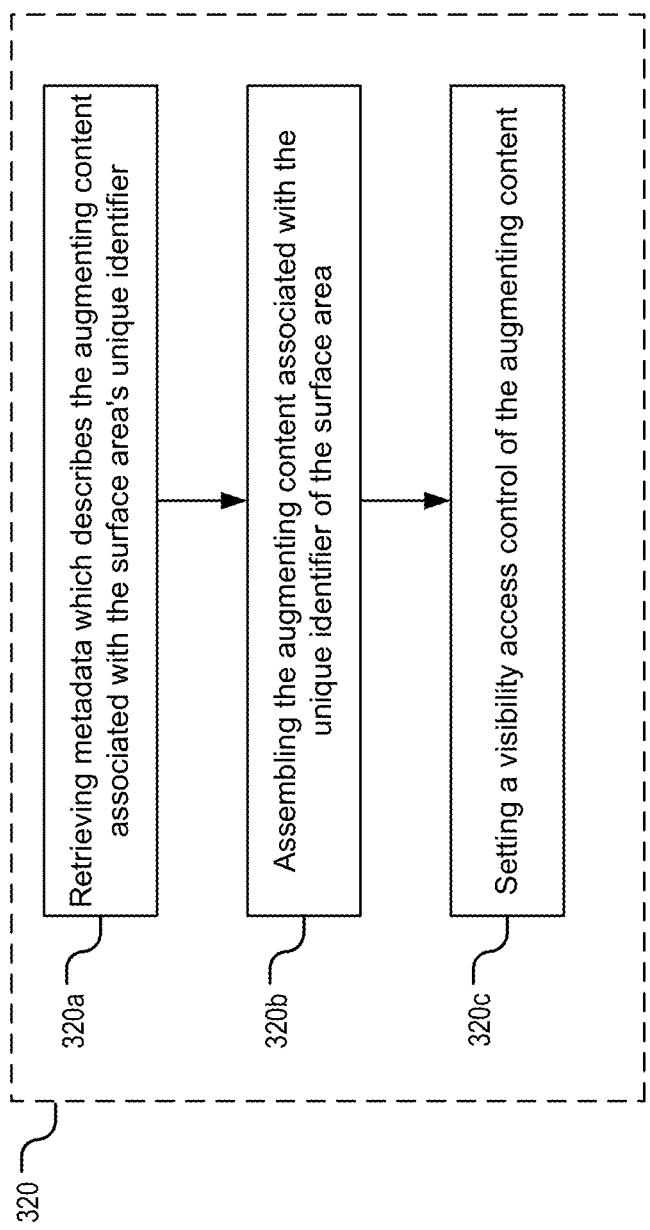
FIG. 3C is a flow chart of a sub-method of associating the unique identifiers with digital content, according to an exemplary embodiment of the present disclosure.

In an embodiment, the first device 101 employs other processes to associate the unique identifiers with the digital content. To this end, FIG. 3C is a flow chart of a sub-method of associating the unique identifiers with digital content, according to an embodiment of the present disclosure. In step 320a, the first device 101 can send the unique identifiers to the second device 150 and the second device 150 can retrieve metadata that describes the digital content, the digital content being associated with the surface area through the unique identifiers. This can be done by querying a remote location, such as a database or a repository, using the unique identifiers of the surface area as the query key. In an embodiment, the first device 101 sends the unique identifiers to the second device 150 and the second device 150 associates the unique identifier of the reference patch to corresponding digital content based on the metadata. The metadata associated with the surface area's unique identifier can be transmitted to the first device 101 with the augmentation content.

In step 320b, the first device 101 can assemble the digital content that is associated with the surface area's unique identifier. The assembly can entail loading the necessary assets for assembling the digital content. In an embodiment, this can entail loading manipulation software or drivers in order to enable the first device 101 to process the digital content. Other assembling processes can be the loading of rendering information in order to transform and manipulate an individual portion of the digital content. Furthermore, the loaded manipulation software, drivers, or rendering information can be used to compile all the individual portions of the entire digital content together. In an embodiment, this can include adapting the file formats of the digital content, delaying the playback for the digital content, converting from one format to another, scaling the resolution up or down, converting the color space, etc.

In step 320c, the first device 101 can provide access control parameters for the digital content. The access control parameters can dictate whether the digital content is visible to some users, or to some geographical locations, or to some types of displays and not others, as well as the date and time or duration of time a user can access the digital content or is allowed to access. In an embodiment, visibility of the digital content can be defined for an individual. For example, the digital content can be a video that is appropriate for users over a certain age. In an embodiment, visibility of the digital content can be defined for a geographic location. For example, the digital content can be a video that is region-locked based on a location of the first device 101. In an embodiment, visibility of the digital content can be defined for a type of display displaying the displayed data. For example, the digital content can be VR-based and will only display with a VR headset. In an embodiment, visibility of the digital content can be defined for a predetermined date and a predetermined time. For example, the digital content can be a video that will only be made publicly available after a predetermined date and a predetermined time. In an embodiment, visibility of the digital content can be defined for a time period. For example, the digital content can be a video that is only available for viewing during a holiday. The first device 101 thus calculates the user's access level based on those parameters and provides an output result as to the user's ability to access the digital content, i.e., whether the digital content will be visible or invisible to the user. Note that the access control parameters can be global, for all the displayed data, or it can be localized per surface area and the underlying digital content.

Referring again to FIG. 3A, in step 325, the first device 101 can carry on the processes of overlaying the surface area with the digital content into the displayed data in accordance with the surface area, the position, and the size identified by the unique identifier. The first device 101 can determine or adjust the size and location of the assembled digital content on the surface area relative to the size and shape of the displayed data being outputted by the display. Then, the first device 101 can render the associated digital content (or the assembled individual portions) over the surface area's shape and perimeter using the size and location information. Thus, the digital content is superimposed on top of the surface area.

The first device 101 can continuously monitor changes that are taking place at the end user's device (such as the second device 102 of the second user) to determine whether the reference patch and/or the surface area has moved or been transformed in any way. Thus, the first device 101 can continuously inspect subsequent frames of the stream of the data (for example, every 1 ms or by reviewing every new frame), displaying the displayed data, to determine these changes. The first device 101 can further continuously decode the reference patch's data from the identified reference patch. Then the first device 101 can continuously extract attributes from the data, the attributes being of size, shape, and perimeter and comparing those changes between the current frame and last frame. Further, the first device 101 can continuously calculate the size and location of the surface area and compare changes between the size and location of the surface area from the current and the last frame and then continuously overlay the digital content on the surface area by incorporating the changes in the reference patch's attributes and the changes in the size and location of the surface area. As stated above, when the user manipulates his/her display device by scaling, rotating, resizing or even shifting the views from one display device and onto another display device, the first device 101 can track these changes and ensure that the digital content is properly being superimposed onto the surface area.

An illustrative example will now be discussed: a scenario where a user (for example, a user at the first device 101) receives (from another device such as the third device 102) an email with the embedded reference patch in the body of the email or as an attached document. The reference patch within the displayed data (email) can show a facade of the digital content or the reference patch. The application on the first device 101 can scan the display to find the reference patch and the surface area and the attributes within the displayed data as it is being displayed. Furthermore, the first device 101 can access the digital content using the unique identifier and metadata and prepare it for overlaying. At which point, the user (i.e., the recipient) can select the digital content by various ways such as by clicking on the digital content's facade or the surface area, or otherwise indicating that it intends to access the digital content.

Thereafter, the digital content can be retrieved from the second device 150 using the unique identifier and the metadata saved within a database that directs the second device 150 to where the digital content is saved and can be obtained. That is, the second device 150 can determine the digital content corresponding to the derived unique identifier and send the digital content corresponding to the unique identifier (and the metadata) to the first device 101. Then, the first device 101 can superimpose (overlay) the digital content on the surface area. While the digital content is being received and overlayed on the surface area, the first device 101 can continually monitor the location, size and/or shape of the reference patch and/or the surface area to determine movement and transformation of the reference patch and/or the surface area. If the user has moved the location of the reference patch and/or the surface area, or has resized or manipulated the screen for whatever purpose, the new location, shape and/or size information of the reference patch and/or the surface area is determined in order to display the digital content properly within the bounds of the surface area. Thus, the digital content moves with the displayed data as the displayed data is moved or resized or manipulated.

In an embodiment, a user that has received the displayed data embedded with the reference patch can access the digital content on his/her first device 101, as described above. The user may want to transfer the ongoing augmenting experience from the first device 101 to another device, such as the device 10n, in a seamless fashion. In that scenario, the user is able to continue the augmenting experience on his/her smartphone, smartwatch, laptop computer, display connected with a webcam, and/or tablet pc. The user therefore can capture the embedded reference patch and therefore the encoded attributes, as the digital content is being accessed and overlaid unto the surface area. The user can capture the embedded reference patch by taking a picture of it or acquiring the visual information using a camera of the third device 102 as mentioned above.

Assuming the user also has the functionality included or the application installed or running on the device 10n, the device 10n would recognize that an embedded reference patch and encoded unique identifiers are in the captured image/video stream. Once the surface area has been determined and the reference patch decoded, the digital content can be obtained from the second device 150, using the unique identifiers and the metadata and then overlaid on the surface area within the displayed data displayed on the device 10n. In an embodiment, as soon as the device 10n superimposes the digital content onto the surface area, the second device 150 or the backend can determine that the stream has now been redirected onto the device 10n and thus push a signal to the first device 101 to stop playing the digital content on the first device 101. The device 10n that is overlaying the digital content can therefore resume the overlaying at the very same point that the first device 101 stopped overlaying the digital content (for instance, when the content is a video for example). Thus, the user is able to handoff the digital content from one device to another without noticing delay or disruption in the augmenting experience.

In another illustrative example of content augmentation, the user can be browsing a page of a website. The webpage may be dedicated to discussions of strategy in fantasy football, a popular online sports game where users manage their own rosters of football players and points are awarded to each team based on individual performances from each football player on the team. After reading the discussion on the website page, the user may wish to update his/her roster of football players. Traditionally, the user would be required to open a new window and/or a new tab and then navigate to his/her respective fantasy football application, to his/her team, and only then may the user be able to modify his/her team. Such a digital user experience can be cumbersome. With augmentation, however, the user may not need to leave the original webpage since a reference patch corresponding to a fantasy football augmentation (i.e., fantasy football digital content for overlaying on the displayed website page) may be positioned within the viewable area of the website page. The corresponding digital content may be, for instance, an interactive window provided by a third-party fantasy football application that allows the user to modify his/her roster without leaving the original website. Thus, instead of navigating to a different website and losing view of the informative fantasy football discussion, the user can simply interact with the digital content that is being overlaid on the displayed data.

In an embodiment, digital objects of the secondary digital content can be realized within a viewable area of a device software application or may reside within an entire viewable display area of the display.

Figure 4A:
FIG. 4A is an illustration of a display, according to an exemplary embodiment of the present disclosure.
Figure 4B:
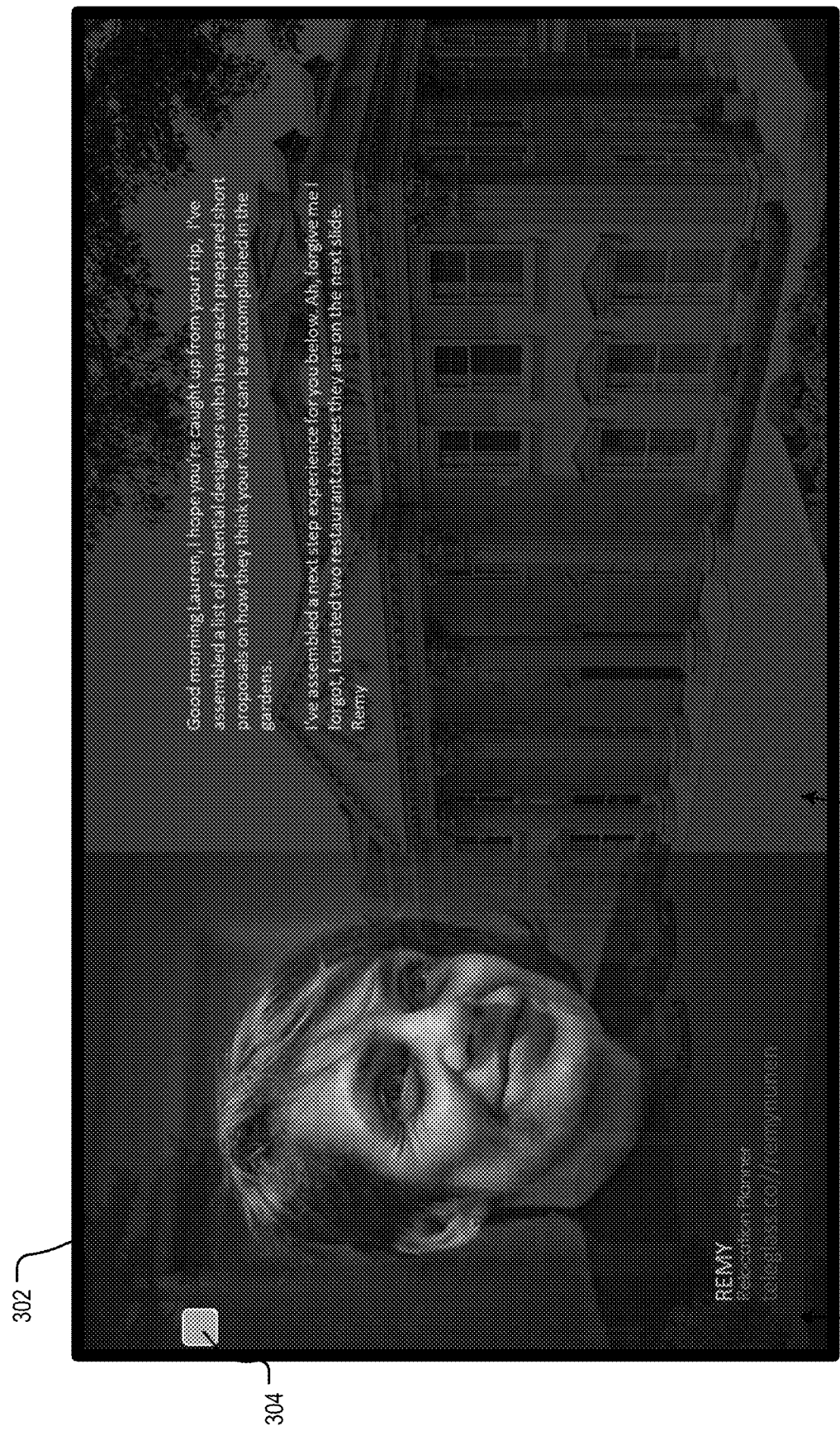
FIG. 4B is an illustration of a reference patch within a frame of a display, according to an exemplary embodiment of the present disclosure.
Figure 4C:
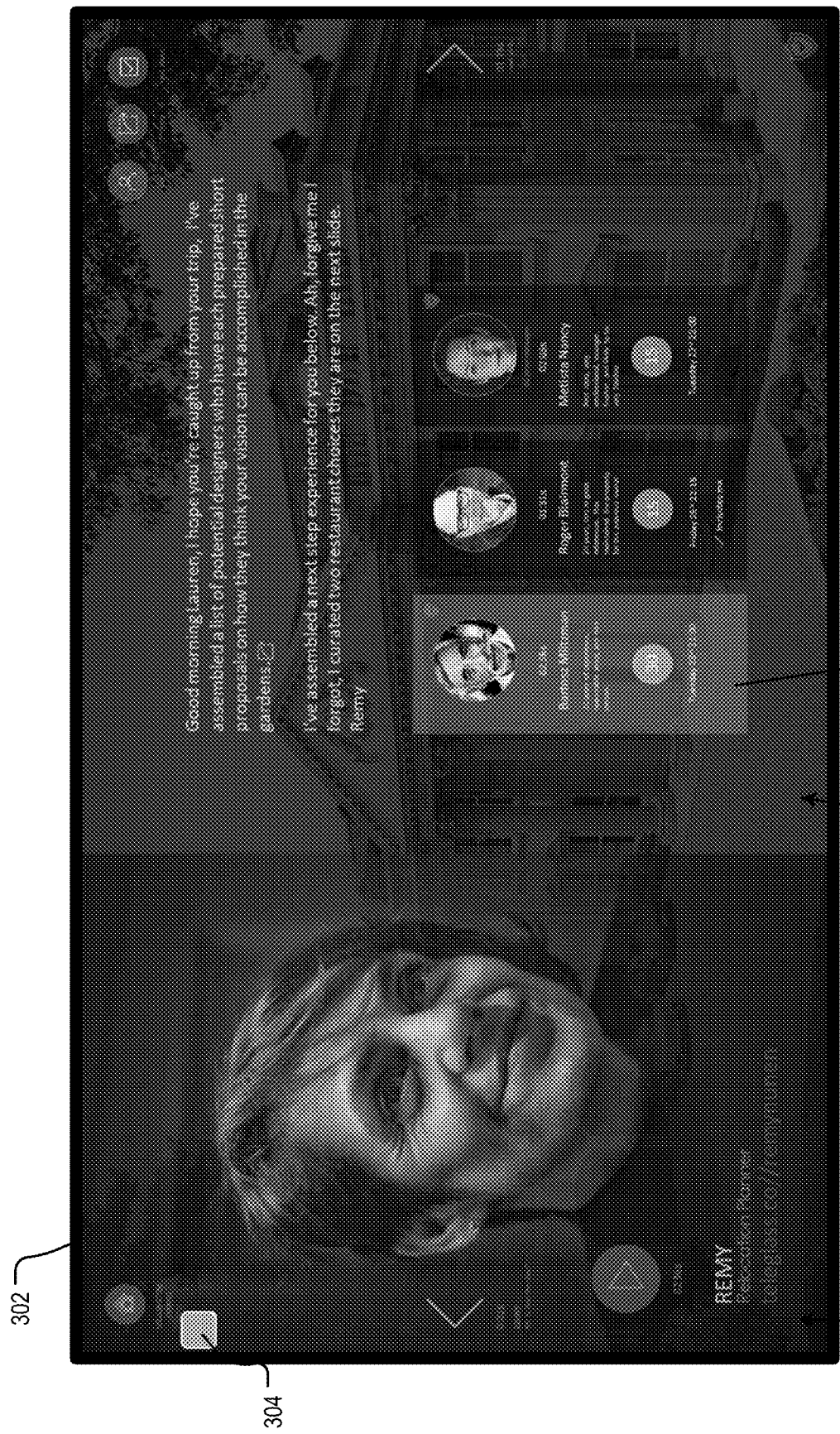
FIG. 4C is an illustration of an augmentation within a frame of a display, according to an exemplary embodiment of the present disclosure.

In an example, as will be described with reference to FIG. 4A through FIG. 4C, the displayed data is a slide deck. The slide deck may be generated by a concierge-type service that seeks to connect a client with potential garden designers. As in FIG. 4A, the slide deck may be presented to the client within a viewable area 303 of a display 302 of the first device 101. The presently viewable content of the slide deck within the viewable area 303 of the display 302 may be a current frame of display data 306. Traditionally, the slide deck may include information regarding each potential garden designer and may direct the client to third-party software applications that allow the client to contact each designer. In other words, in order to connect with one or more of the potential garden designers, the client, traditionally, may need to exit the presentation and navigate to a separate internet web browser in order to learn more about the garden designers and connect with them. Such a digital user experience is cumbersome.

With augmentation, however, the client need not leave the presentation in order to set up connections with the garden designers. For instance, as shown in FIG. 4B, a reference patch 304 can be positioned within the slide deck to be in the current frame 306 and viewable within the viewable area 303 of the display 302 at an appropriate moment. As shown in FIG. 4C, the reference patch 304 may correspond to digital content 399 (i.e., one or more augmentations) and, when the reference patch 304 is visible to/detectable by the first device 101, the digital content 399 is retrieved and displayed by the first device 101 at the corresponding surface area. The digital content 399 can include, as shown in FIG. 4C, interactive buttons, images, videos, windows, and icons, among others, that allow the client to interact with the displayed data and to, for instance, engage with the garden designers without leaving the presentation. In an example, the interactive digital content 399 may allow for scheduling an appointment with a given garden designer while still within the slide deck.

The above-described secondary digital content is particularly relevant to environments where the underlying content is static. Static content may include textual documents or slide decks. Often, the static content is stored locally. Due to its nature, the static content is not capable of being dynamically adjusted according to complex user interactions, in real-time, during the user experience. The use of reference patches enables the digital content 399 to be overlayed onto static content when the reference patch is visible. Thus, modifications to the content as a whole can be made by modifying the digital content 399 in response to new information and/or user interactions for each reference patch. That is, a single reference patch can be associated with a predetermined location of the digital content 399, but the digital content 399 associated with the single reference patch can be adjusted or updated over time. Modifying only the dynamic augmentations and/or digital content results in the content being more agile and customizable while maintaining the accessibility of the static content (displayed data).

Such a dynamic environment includes one where, for instance, a video conversation is occurring. A first participant of the video conversation may share his/her screen with a second participant of the video conversation and wish to remotely-control an augmentation on a display of a device of the second participant. By including the reference patch 304 within the displayed data that is being shared, which may be the video itself or another digital item, where sharing the displayed data includes transmitting the displayed data over a communication network from the first participant to the second participant, the second participant may be able to experience the digital content when the device of the second participant receives the transmitted displayed data and processes it for display to the user.

Generally, and as introduced in the above example of a dynamic environment, the reference patch 304 can be inserted into displayed data displayed on a first computer or the first device 101. The display of the first device 101 can be streamed to a second computer or the third device 102. In an example, the third device 102 decodes the streamed display of the first device 101 and, based on the identified presence of the reference patch 304, can locally-augment the display of the third device 102 to overlay the intended digital content on the streamed display of the first device 101. The design and the arrangement of the digital content can be provided relative to the reference patch 304 placed into the displayed data on the first device 101. The digital content can include objects to be displayed and may be configured to display different subsets of objects based on interactions of a user with the digital content. The objects, therefore, may be interactive. This dynamic environment reduces the bandwidth needed to transmit complete displayed data because the first computer does not need to send the intended digital content to the third device 102 as the third device 102 applies the digital content locally based on the reference patch. In one embodiment, detecting and/or decoding the reference patch enables the third device 102 to access the intended digital content from a remote server, such as the second device 150. Alternatively, the reference patch includes data instructions for the third device 102 to create and overlay the digital content.

In an example of a live video stream, a user may be a yoga instructor teaching a remote yoga class by Microsoft Teams. Each participant in the class may be able to view the yoga instructor via their respective devices, wherein the 'live streamed' video includes video of the yoga instructor guiding the participants of the class through the techniques. At the end of class, the yoga instructor may wish to receive payment from each of the participants. The instructor may open a cloud-based slide which, for instance, may have the reference patch 304, therein. The reference patch 304 may be configured to augment a pay button relative to a position of the reference patch 304 on a device display of each participant. Upon screen sharing the cloud-based slide with the participants in the class, each participant's device receives the transmitted displayed data and processes the displayed data for display. During processing, each device observes and identifies the reference patch 304 within the displayed data. Accordingly, each device can generate a local augmentation (i.e., retrieve and display the corresponding digital content) on a respective display in order for the participant to be able to enter the payment information and pay for the remote yoga class. The digital content may be generated within the live video stream.

In such video example, reference patches can be placed within recorded streams of data. A decoder present at the end user device can be used to identify the reference patch and then locally augment the display of the end user device to allow for dynamic user interaction with the augmentation of the recorded video.

In an embodiment, the augmentations can be the same for all viewers of the recorded video. In another embodiment, the augmentations may be personalized for each viewer of the recorded video. The augmentations can be live and updated in real time (or at the same time scale as the recorded video). The augmentations can be attended or non-attended. In a non-limiting example of an attended augmentation, a version of an educational video may have a teacher controlling the experience for students watching the educational video on remote devices by applying digital content to the educational video that appear on the displays of the remote devices.

According to an embodiment, displayed data that has been transmitted from the first device 101 to the third device 102 can be encoded by the first device 101 and processed (e.g., decoded) by a decoder at the third device 102. The decoder may be configured to operate on a Linux operating system, in an example. Accordingly, the decoder may be readily adapted to an operating system operating on a mobile device, smart television, or similar device.

Thus, the present disclosure provides methods for generating local augmentation experiences and ensuring a happy digital user experience.

Having obtained the digital content, the augmentation of the user visual experience can be realized. This can include displaying, based on the rendering instructions, the digital content relative to the reference patch within a transparent layer of the display. The transparent layer of the display may be a topmost layer of the display so as to 'overlay' the augmentation on the underlying displayed data.

The layer can refer to digital content displayed in a window of an electronic device, such as the display of the user's device. Within a window of the user's device, which can be a computer or smartphone display, the device is typically configured to display a single layer of content at a time. In a traditional electronic device, if a full-screen Microsoft PowerPoint presentation (i.e. first layer) is being displayed on a device's window, that device cannot display a full-screen movie (i.e. second layer) without covering up the Microsoft PowerPoint. Furthermore, only the upper-most layer (i.e. the digital content of the layer being displayed in the window) is configured to receive inputs, such as keyboard and mouse inputs from a user of the device. For layers beneath the upper-most layer, pixels cannot be clicked on unless that layer is brought up to the upper-most layer (i.e. displayed).

In comparison, as described herein, multiple layers of content can be managed, manipulated, and merged into a single computing experience. In other words, multiple layers can be superimposed and displayed simultaneously within the same window, where a window refers to the viewing area of a display/screen.

In an embodiment, this is accomplished by adjusting a transparency of pixels in one or more layers to achieve a semi-transparent effect. That way, any number of simultaneous media sources can be displayed in a window such that the blended input media can optically appear to exist either in front of or behind other layers.

In an embodiment, a layer is a computer vision layer. The computer vision layer may be a layer of the construction of explicit, meaningful descriptions of physical objects from images as determined by computer vision. The content in the layer may be determined using image data from a first channel (or input or source), e.g., a camera, or from a second channel (or input or source), e.g., a camera. The computer vision layer may be visible, semi-visible, or invisible to the users. The computer vision layer may be further used, by the first device 101 or controlled by a server (e.g. the second device 150), to make useful decisions about real physical objects and scenes based on sensed images such as the one or more digital images from, but not limited to, cameras, etc. In some embodiments, the layer may also be a video layer. In some embodiments, the layer may not include only one layer, it may include more than one layer.

Figure 5:
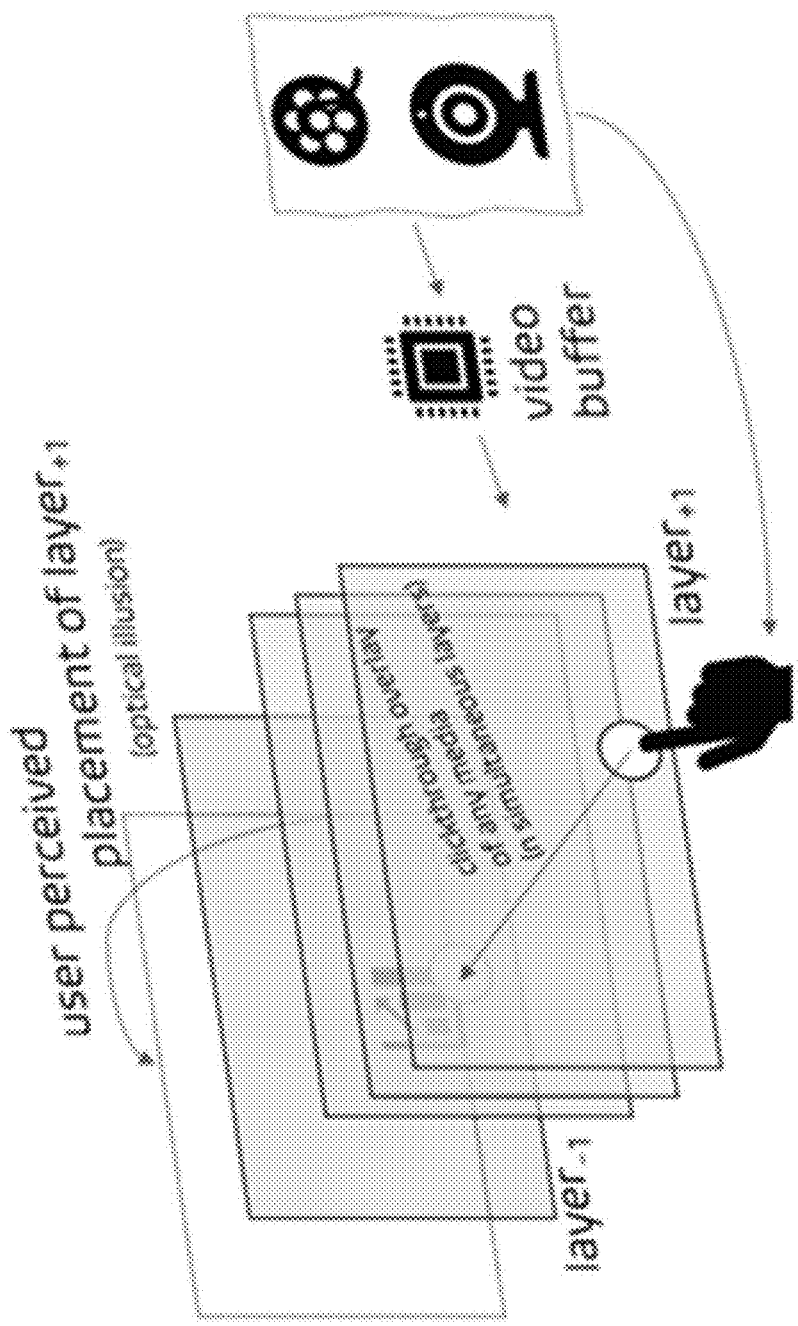
FIG. 5 is an illustration of a multilayer experience, according to an exemplary embodiment of the present disclosure.

According to an embodiment, and with reference again to the figures, FIG. 5 illustrates an example of such a multilayer experience. One or more layers are retrieved from memory (e.g., frame buffers) and overlaid over one another as "layer +1". Pixel characteristics, such as a transparency, of each pixel in one or more layers of the layer +1 are configured to be semi- or fully transparent. These one or more layers in the layer +1, now at least partially see-through, can be shown on top of, and in the same window as, a "layer −1" (e.g., operating system displayed data). In this exemplary scenario, pixels on the layer −1 have click-ability on, whereas pixels on the layer +1 have click-ability off, though any pixel(s) in either layer can "move" between any of the layers by adjusting click-ability and/or transparency. The overall effect is an optical illusion for a user viewing the device, where the one or more layers from the layer +1 seem to be displayed behind the layer −1. Click-ability refers to whether a trigger, such as a click, causes a particular action to be performed; when click-ability is on, a trigger can cause an action to be performed, whereas when click-ability is off, a trigger does not cause an action to be performed.

In one embodiment, click-ability can be utilized via gestures from a user (i.e. touch-ability). For example, one of the layers in the layer +1 can show live video of the user, and gesture-recognition techniques can be used to track the user as they click on pixels in the layer −1. This can look like displaying a live video of the user from a webcam buffer as a layer in the layer +1, displaying an operating system desktop from a video buffer on the layer −1, turning off the click-ability of all pixels on the layer +1, and interacting with pixels on the layer −1 using gesture information from a user. From a user's perspective, visual feedback of himself/herself via the live video can indicate, for instance, that his/her hand is located over a particular button or file in the layer −1 for clicking.

Figure 6:
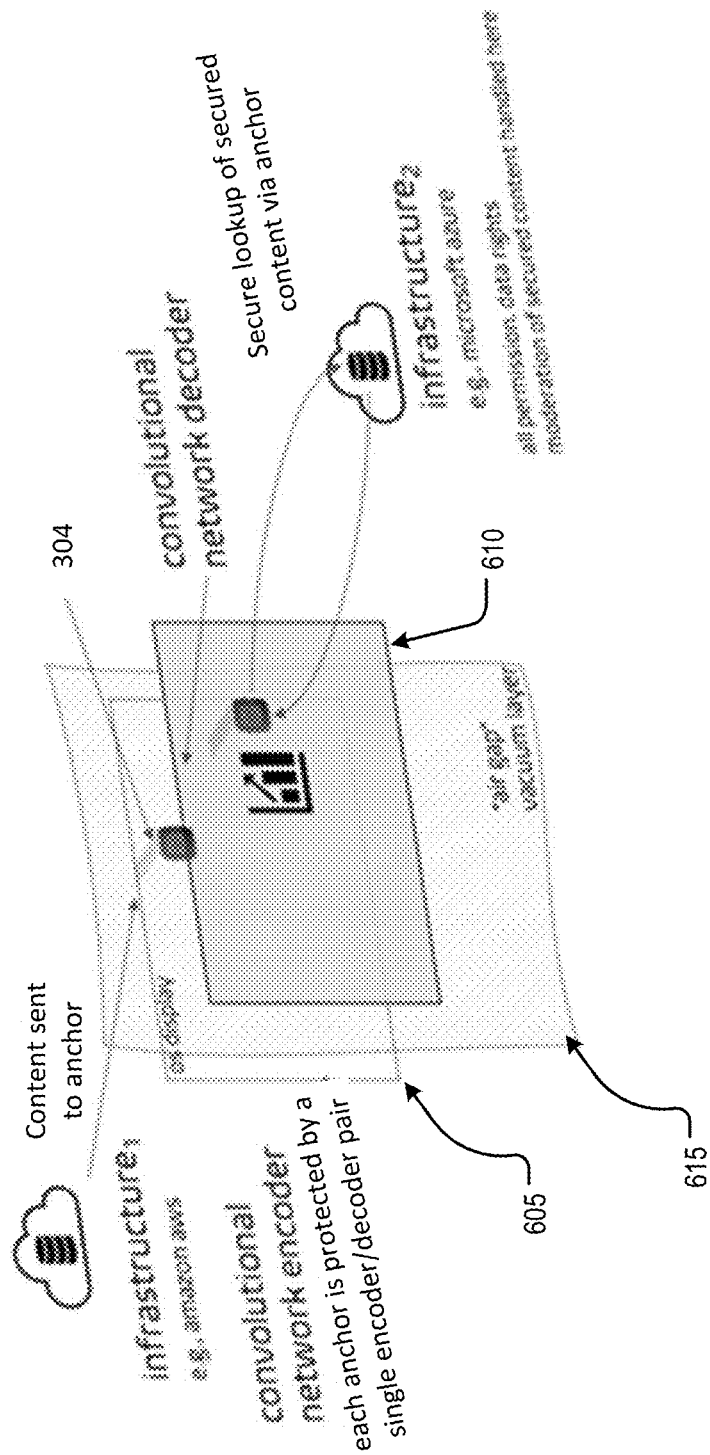
FIG. 6 is an illustration of a threat vacuum layer formation, according to an exemplary embodiment of the present disclosure.

According to an embodiment, and with reference again to the figures, FIG. 6 illustrates a first layer 605 and a second layer 610. The second layer 610 can be a computer vision layer that is retrieved from memory of the device as previously described. For example, the second layer 610 can be retrieved from memory, such as a frame buffer. The second layer 610 can be visible, semi-visible, or invisible to the users. Pixel characteristics, such as the transparency, of each pixel in the second layer 610 can be semi-transparent. The first layer 605 can be a desktop or a video layer. The desktop can be a window or a home screen in an operating system of the first device 101. The first device 101 can be a user's desktop computer, laptop, tablet, cell phone, or the like. The desktop can also be a screen containing one or more applications of the first device 101 such as computer, laptop, tablet, cell phone, or the like. The first layer 605 can display the videos or images from one or more video data sources, e.g., on a desktop monitor. The video source includes, but is not limited to, computer webcam(s), public camera(s) in various places such as, but not limited to, ski resorts, train stations, airports, etc., streaming internet videos online such as, but not limited to, Netflix, Amazon prime, YouTube, mobile device camera(s) from users, etc. In some embodiments, the first layer 605 may not be only one layer; it can include more than one layer. Similarly, the second layer 610 may not only be one layer; it can also include more than one layer.

In an embodiment, a layer can be a visible layer or interface that displays digital content as described above. The visibility of the layer can be adjustable such that the layer can be opaque, translucent, transparent, visible, and/or semi-visible. In one embodiment, the layer can be invisible or not visible to the user. In one embodiment, the layer can be displayed using at least one function, wherein the at least one function is executed independently of functions that are not involved in displaying the layer. Examples of the at least one function can include, but are not limited to, filling a frame buffer, reading a frame buffer, displaying content, using computer vision to identify visual content (e.g., the reference patch 304), fetching display content, enabling interactions with a device, and/or executing an application programming interface (API) call.

In one embodiment, the reference patch 304 can be disposed on an operating system layer (i.e., the first layer 605). In one embodiment, the software and/or hardware associated with a first layer are separate from the software and/or hardware associated with a second layer. That is, the first layer can be configured to display data of a first software application while the second layer can be configured to display data of a second software application. In one embodiment, a first layer (the first layer 605) can be configured to display data of an operating system, while a second layer (the second layer 610) can be associated with a software application running atop the operating system. In one embodiment, a first layer (the first layer 605) can be configured to display data of a native software application of a predetermined operating system, while a second layer (the second layer 610) can be associated with a non-native software application running atop the operating system. For example, the predetermined operating system can be Microsoft Windows and the native application to Microsoft Windows can be Microsoft Word on the first layer, and the non-native application can be Adobe Acrobat on the second layer. For example, the non-native application can be an application downloaded from an external source, such as the Google Play Store or the Apple App Store. For example, the non-native application can be configured to use computer vision techniques to scan displayed data displayed on the first layer by the native software application (e.g., Microsoft Word).

In one embodiment, the first layer and the second layer can be executed by the same software stack, but the first layer and the second layer do not send or receive data to each other, thus maintaining independent processes and communication protocols. Data associated with the reference patch 304 can be passed to the second layer 610 when the second layer 610 (e.g., via the second software application associated with the second layer 610) detects the visual data including the reference patch 304. For example, the data associated with the reference patch 304 can include a size and location of the reference patch 304, an appearance or façade of the reference patch, and the unique identifier included therein, among others. Notably, this can be the only data about the reference patch 304 that is passed between the first layer 605 and the second layer 610 (or any other layers), such as from the first layer 605 to the second layer 610.

In an embodiment, the first device 101 can analyze images or videos in the first layer 605 and the second layer 610. It may be appreciated that the first device 101 can be instructed, e.g., by a server (such as the second device 150), to continually monitor for and analyze the images or videos in the first layer 605 and/or the second layer 610. In one example, a convolutional neural network (CNN) encoder can embed the reference patch 304 into any displayed data (e.g., documents, video streams, etc.) displayed on the first layer 605, wherein the reference patch 304 is CCN-readable. The displayed data, including the reference patch 304, can be received, for instance, from another device (e.g. from another user), from the server, retrieved from memory, or the like. The reference patch 304 can further include a unique identifier for said detection and for tailoring the data corresponding to the reference patch 304. In one embodiment, the unique identifier can be visually detected along with the reference patch 304 by the first device 101, such as via the second software application associated with the second layer 610. For example, the unique identifier includes an alphanumeric string that is read by the first device 101 (e.g., via the second software application associated with the second layer 610) using optical character recognition (OCR). In one embodiment, the first device 101 can be configured to access a function that maps the reference patch 304 to the unique identifier. That is, additional reference patches can be added into additional displayed data and detected by the first device 101, wherein each reference patch 304 is unique in the displayed data it will provide to the user. In one embodiment, the reference patch 304 is encoded using an encoder neural network (e.g., an encoder CNN) and decoded using a decoder neural network (e.g., a decoder CNN). In one embodiment, the reference patch further includes metadata used for encoding and/or decoding. In one embodiment, the unique identifier is revealed when the reference patch 304 is decoded.

The displayed data encoded with the reference patch 304 can be sent to one or more users who have installed the software application, e.g., the first device 101, the third device 102, the nth device 10*n*. In an example, the first device 101 receives the displayed data, including the reference patch 304, from the server 150. In an example, the third device 102 receives the displayed data (e.g. from the first device 101 via a wired or wireless connection) and is running the application. In an embodiment, the receiving device, such as the third device 102, accesses the displayed data via a remote connection with a receiving device, such as the first device 101, e.g., by streaming the displayed data from the first device 101, via screensharing. That is, the first device 101 can display the displayed data on the first layer 605 on the first device 101 and the third device 102 can be streaming the displayed data via a second software application associated with the second layer 610 on the third device 102. As previously mentioned, the third device 102 can be instructed, by the server 150 (such as the second device 150 described in FIG. 1), to perform the continuous monitoring and scanning. The third device 102 can continuously monitor or scan for the reference patch 304 on the first device 101 using the previously described computer vision techniques. Upon determining the reference patch 304 is present in the first layer 605 (e.g., in the displayed data displayed in the first layer 605 on the first device 101 and monitored by the second layer 610 on the third device 102 for analysis and detection of the reference patch 304), the third device 102 can decode the unique identifier from the reference patch 304. In an embodiment, the third device 102 continuously scans the displayed data for the reference patch 304.

For example, the first device 101 can be a desktop computer and the third device 102 can be a smart phone, wherein the first device 101 can be displaying a reference patch 304 associated with a user profile in the first layer 605 on the first device 101 via a first software application, such as Microsoft PowerPoint. Instead of transmitting confidential information included in the user profile from the first device 101 to the third device 102, the third device 102 can include a second software application on the second layer 610 of the third device 102 capable of using computer vision to detect the reference patch 304 included in a PowerPoint slide displayed on the first layer 605 of the first device 101. Upon the second software application detecting the reference patch 304, the third device 102 can decode the unique identifier and transmit the decoded information to a server (e.g., the second device 150). In an embodiment, the server can receive the encoded reference patch 304 and the server can decode the reference patch 304. The server can determine the decoded information is associated with the user profile and authorized to receive the confidential user profile information. The server can send the confidential user profile information to the third device 102 and instruct the third device 102 to display the confidential user profile information in the second layer 610 on the third device 102. In an embodiment, the third device 102 can also replicate the displayed data in the first layer 605 of the first device 101 (i.e., the PowerPoint slide data) on the third device 102, e.g., on the same second layer 610 or on another layer, and overlay the confidential user profile information in the second layer 610 onto the replicated displayed data from the first layer 605 of the first device 101.

In an embodiment, the third device 102 can scan at least one region of the displayed data for the reference patch 304. In an embodiment, the third device 102 can scan a portion of the displayed data displayed in the first layer 605 for a flag. The flag is a visual indicator that the displayed data includes the reference patch 304. The flag can be located in a fixed area on the displayed data (whereas the reference patch 304 may adjust position while the user scrolls, re-sizes a window, moves a window, etc.). Scanning the fixed area of the displayed data for the flag reduces the processing required by the processing circuitry. Once the flag is detected in the fixed area, the third device 102 can then be instructed (e.g., by the server 150) to scan all of the displayed data in order to detect the reference patch 304.

As previously mentioned, in an embodiment, the first device 101 can receive the displayed data including the reference patch 304 from the server 150 (the second device 150) and detect the reference patch 304. The first device 101 can have previously securely authenticated the user and generated a secured session token. Thus, the first device 101 can send the user's secured session token and the unique identifier obtained from the reference patch 304 to the server 150, such as a secured SaaS system. Upon receiving the unique identifier associated with the reference patch 304 and, optionally, the secured session token, the server 150 can identify the specific user from the unique identifier and the secured session token and determine whether a user account associated with the first device 101 is authorized to receive the specific user digital content that corresponds to the unique identifier of the reference patch 304. Upon determining the specific user is authorized to receive the corresponding specific user digital content, the server 150 can send said information to the first device 101 where the digital content is added to the application by the first device 101. For example, the digital content can be added to the second layer 610 (at a corresponding location where the reference patch 304 is located on the first layer 605) instead of the first layer 605. Thus, the specific user digital content can visually "float above" the first layer 605 (i.e., the OS display layer) and is never directly added to the first layer 605 or the original digital content the reference patch 304 was included in. That is, the digital content can be displayed in the second layer 610 and the second layer 610 can be overlayed on the first layer 605 wherein the digital content can be displayed in the second layer 610 at the corresponding location where the reference patch 304 is located (or where the encoded data of the reference patch 304 has instructed the digital content to be overlayed). Thus, there is an "air gap" of security, or a direct communication protocol break, created between the first layer 605 and the second layer 610. The second layer 610 does not receive data from the first layer 605 or send data to the first layer 605 in order to display the digital content, and the digital content and original displayed data are both visible.

More generally, the first layer 605 can be a first type of binary file format that is isolated from the second layer 610. The first layer 605 being the first type of binary file format can be kept separate or isolated from the second layer 610 having a second type of binary file format such that there is no mixing or exchanging of data directly between the first layer 605 and the second layer 610. The second layer 610 can read data also having the first type of binary file format from the first layer 605. For example, the second layer 610 can use the one of a variety of computer vision techniques to read the data from the first layer 605. The second layer 610 can convert the data read from the first layer 605 into the second type of binary file format as the second layer 610. In other words, transmission of the data stored in the first layer 605 can be accomplished using a pixel-based construct. Pixel locations on a screen can be used to place digital content in pixels to yield a raster version of electronic binary data or structured data in the first layer 605. The second layer 610 can then scan and interpret the raster image of the first layer 605 to read the displayed data. The second layer 610 thus does not need to access the binary data or structured data of the first layer 605 directly, but rather can collect the same displayed data from the raster image. This can help prevent any attacker from obtaining the data from the first layer 605 via data mixing or exchanging with the second layer 610 because the data is not directly transmitted to the second layer 610. In an embodiment where the first layer 605 is on the first device 101, the second layer 610 is on the second user device 102, and the first device 101 and the second device 102 are connected via direct communication protocols or methods such as LAN, WiFi, fiber optic, USB, etc., the air gap or direct communication protocol break via said methods between the first device and the second device can prevent a hacker from obtaining any data over said direct communication protocols since no data is passed through the aforementioned.

For example, the first layer 605 can display a Microsoft Word document (herein referred to as a "Word document") having text and figures written or included therein, the Word document having the first type of binary file format that can be used (i.e., is compatible with, can be read by, or can be opened by) by a program, for example, Microsoft Office. That is, Microsoft Office can open the Word document having the first type of binary file format and convert the data of the Word document to the text and figures the user can read and interpret. Instead of the first layer 605 exchanging or mixing data with the second layer 610 via the direct communication protocols described above, the first layer 605 can display the Word document and the second layer 610 can read the content of the Word document from the first layer 605, e.g., using at least one image recognition technique via a software application associated with the second layer 610. The second layer 610 can store the content on the second layer 610. The second layer 610 can convert the content to the second type of binary file format. The second layer 610 can transmit the content in the first type of binary file format or the second type of binary file format to another device, such as to a server. The second layer 610 (via the software application associated with the second layer 610 installed on the device having the second layer 610 therein) can decode any encoded information detected and obtained from the first layer 605.

Notably, the first layer 605 does not directly communicate data to the second layer 610 and expose the first layer 605 to leakage of data to unwanted parties or entities. Rather, the text and figures in the Word document can be displayed by the first layer 605. Moreover, the text and figures displayed in the pixels can correspond to a meaning that the second layer 610 can read, interpret, and/or store. The second layer 610 can directly obtain the content via, for example, computer vision, wherein the computer vision can determine the pixel locations and the content of the data being conveyed in the Word document. Thus, the first layer 605 does not directly transmit the content to the second layer 610. As previously described, this advantage can be realized when both the first layer 605 and the second layer 610 are on a single device (e.g., the first device 101) or when the first layer 605 and the second layer 610 are on separate devices (e.g., the first layer 605 on the first device 101 and the second layer 610 on the third device 102 with separate software applications associated therewith or installed thereon).

In a direct communication protocol, a hacker may intercept the Word document as it is transmitted from the first layer 605 to the second layer 610 and be able to read the content of the Word document using Microsoft Office. Furthermore, the hacker may further embed a malicious software (e.g., malware, spyware, a virus, etc.) in the Word document that is received by the second layer 610. However, since the first layer 605 does not transmit the Word document via the direct communication protocols to the second layer 610, there is no chance for the hacker to obtain or alter the Word document over the direct communication protocol.

In summary, there is no mixing of two or more binary layers—data is isolated to each layer and kept separate. The layers are never in contact and there is no direct data connection between layers. In effect, an air gap of security is created.

Thus, any unprotected digital content can be kept separate from protected digital content (i.e. the specific secondary display content) but blended visually in real-time in the user's device's display. This therefore creates the air gap, direct communication protocol break, or threat vacuum layer 615 between said unprotected and protected digital content on separate layers. The threat vacuum layer 615 in effect limits what threats can be transferred into the second layer 610 via a communication protocol (i.e. the application running on the OS), while also allowing data to be obtained by the second layer 610 from the first layer 605 without potential threats obtaining data transmitted by the first layer 605 or breaching the second layer 610.

Notably, additional air gaps or threat vacuum layers 615 can be created. That is, one or more of the threat vacuum layers 615 can be created between the multiple layers. For example, a third rendering executable on the operating system (e.g. a third layer) is only capturing the interactions data and sending it to a back end of the user's device (e.g. mouse, keyboard, camera, mic, etc.). Furthermore, each executable can be written in different languages/compiler combinations. For example, the computer vision executable can be written in C++, the augmentation executable in python/PHP, and the rendering executable in Angular JS with HTML 5 and CSS3.

As such, this provides the advantage of distancing security vulnerabilities of the operating system being from any application running on the operating system.

Figure 7:
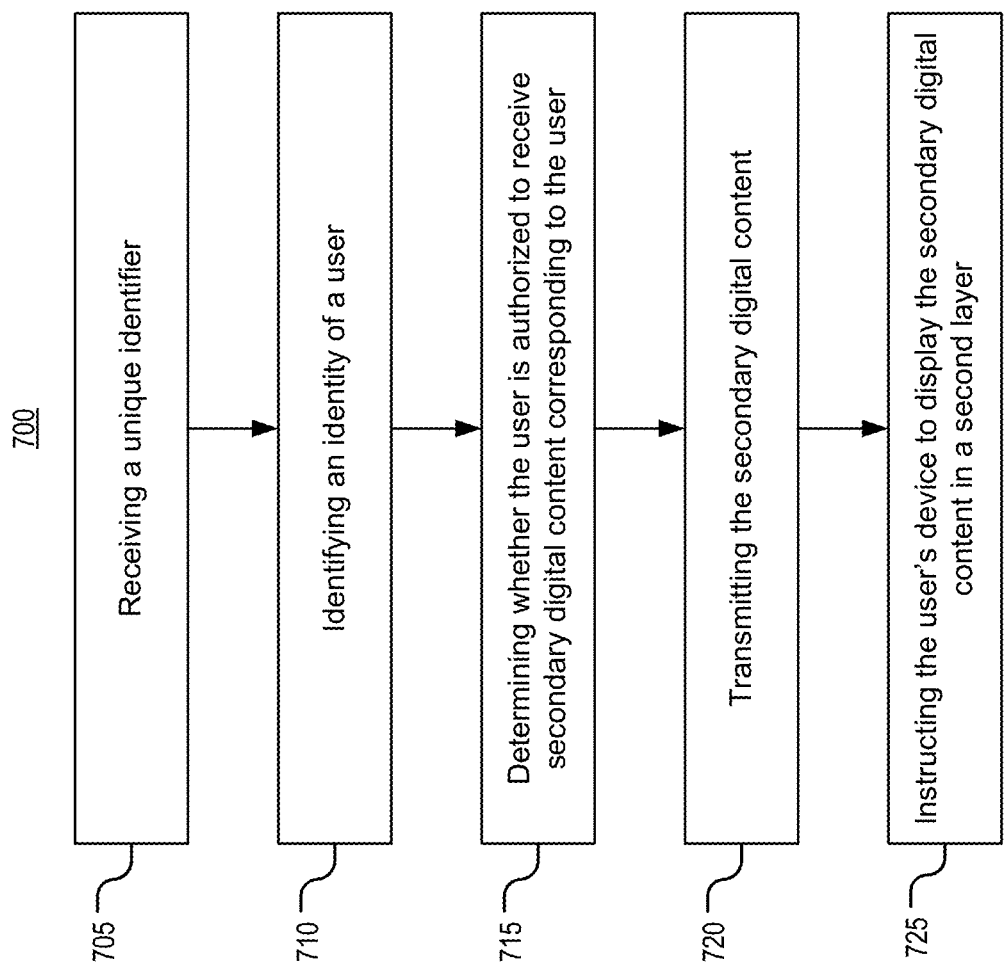
FIG. 7 is a flow diagram of a method, according to an exemplary embodiment of the present disclosure.

According to an embodiment, and with reference again to the figures, FIG. 7 provides a flow diagram of a method 700 for securing transmitted data. The method 700 is described from the perspective of a server (e.g., the second device 150) that is configured to control a user device, e.g., the first device 101, the second user device 102, etc., receive authentication information from the first device 101, and send or transmit the digital content to the first device 101 to display the digital content on the display 302 of the first device 101 in a second layer of at least two layers. In an example, the first device 101 can receive displayed data from another device, wherein the reference patch 304 is included in the displayed data.

At step 705 of method 700, the server receives the unique identifier information from the reference patch detected and decoded by the user's device, such as the first device 101, along with the secured session token, the reference patch being embedded in the displayed data received by the user's device and included or displayed in the first layer 605 on the user's device.

At step 710 of method 700, the server authenticates the secured session token and identifies the specific user identification from the unique identifier of the reference patch.

At step 715 of method 700, the server determines whether the user is authorized to receive the specific digital content that corresponds to the unique identifier of the reference patch for the user.

At step 720 of method 700, upon determining the user is authorized to receive the digital content, the server transmits the digital content to the user's device, e.g., the first device 101. Notably, the digital content can be sent to another device instead, such as the third device 102.

At step 725 of method 700, the server instructs the user's device to display the digital content (overlay the digital content on the displayed data) in the second layer 610 on the application.

Embodiments of the subject matter and the functional operations described in this specification are implemented by processing circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of a data processing apparatus/device, (such as the server 150, the first device 101, or the like). The computer storage medium can be a machine-readable storage device, a machine-readable storage substrate, a random or serial access memory device, or a combination of one or more of them.

The term "data processing apparatus" refers to data processing hardware and may encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both or any other kind of central processing unit. Generally, a CPU will receive instructions and data from a read-only memory or a random-access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients (user devices) and servers. A client and server are generally remote from each other and typically interact through a communication network. The relationship of client and server arises by virtue of computer programs running on the respective computers and having a client-server relationship to each other. In an embodiment, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Electronic device 80 shown in FIG. 8 can be an example of one or more of the devices shown in FIG. 1. In an embodiment, the device 80 may be a smartphone. However, the skilled artisan will appreciate that the features described herein may be adapted to be implemented on other devices (e.g., a laptop, a tablet, a server, an e-reader, a camera, a navigation device, etc.). The device 80 of FIG. 8 includes processing circuitry, as discussed above. The processing circuitry includes one or more of the elements discussed next with reference to FIG. 8. The device 80 may include other components not explicitly illustrated in FIG. 8 such as a CPU, GPU, frame buffer, etc. The device 80 includes a controller 810 and a wireless communication processor 802 connected to an antenna 801. A speaker 804 and a microphone 805 are connected to a voice processor 803.

The controller 810 may include one or more processors/processing circuitry (CPU, GPU, or other circuitry) and may control each element in the device 80 to perform functions related to communication control, audio signal processing, graphics processing, control for the audio signal processing, still and moving image processing and control, and other kinds of signal processing. The controller 810 may perform these functions by executing instructions stored in a memory 850. Alternatively, or in addition to the local storage of the memory 850, the functions may be executed using instructions stored on an external device accessed on a network or on a non-transitory computer readable medium.

The memory 850 includes but is not limited to Read Only Memory (ROM), Random Access Memory (RAM), or a memory array including a combination of volatile and non-volatile memory units. The memory 850 may be utilized as working memory by the controller 810 while executing the processes and algorithms of the present disclosure. Additionally, the memory 850 may be used for long-term storage, e.g., of image data and information related thereto.

The device 80 includes a control line CL and data line DL as internal communication bus lines. Control data to/from the controller 810 may be transmitted through the control line CL. The data line DL may be used for transmission of voice data, display data, etc.

The antenna 801 transmits/receives electromagnetic wave signals between base stations for performing radio-based communication, such as the various forms of cellular telephone communication. The wireless communication processor 802 controls the communication performed between the device 80 and other external devices via the antenna 801. For example, the wireless communication processor 802 may control communication between base stations for cellular phone communication.

The speaker 804 emits an audio signal corresponding to audio data supplied from the voice processor 803. The microphone 805 detects surrounding audio and converts the detected audio into an audio signal. The audio signal may then be output to the voice processor 803 for further processing. The voice processor 803 demodulates and/or decodes the audio data read from the memory 850 or audio data received by the wireless communication processor 802 and/or a short-distance wireless communication processor 807. Additionally, the voice processor 803 may decode audio signals obtained by the microphone 805.

The exemplary device 80 may also include a display 820, a touch panel 830, an operation key 840, and a short-distance communication processor 807 connected to an antenna 806. The display 820 may be an LCD, an organic electroluminescence display panel, or another display screen technology. In addition to displaying still and moving image data, the display 820 may display operational inputs, such as numbers or icons which may be used for control of the device 80. The display 820 may additionally display a GUI for a user to control aspects of the device 80 and/or other devices. Further, the display 820 may display characters and images received by the device 80 and/or stored in the memory 850 or accessed from an external device on a network. For example, the device 80 may access a network such as the Internet and display text and/or images transmitted from a Web server.

The touch panel 830 may include a physical touch panel display screen and a touch panel driver. The touch panel 830 may include one or more touch sensors for detecting an input operation on an operation surface of the touch panel display screen. The touch panel 830 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 830 may detect when the stylus approaches/contacts the operation surface of the touch panel display (similar to the case in which a finger is used for the touch operation).

In certain aspects of the present disclosure, the touch panel 830 may be disposed adjacent to the display 820 (e.g., laminated) or may be formed integrally with the display 820. For simplicity, the present disclosure assumes the touch panel 830 is formed integrally with the display 820 and therefore, examples discussed herein may describe touch operations being performed on the surface of the display 820 rather than the touch panel 830. However, the skilled artisan will appreciate that this is not limiting.

For simplicity, the present disclosure assumes the touch panel 830 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 830 may include transparent electrode touch sensors arranged in the X-Y direction on the surface of transparent sensor glass.

The touch panel driver may be included in the touch panel 830 for control processing related to the touch panel 830, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in an embodiment, the touch panel 830 may detect a position of a user's finger around an edge of the display panel 820 (e.g., gripping a protective case that surrounds the display/touch panel). Signals may be transmitted by the touch panel driver, e.g., in response to a detection of a touch operation, in response to a query from another element based on timed data exchange, etc.

The touch panel 830 and the display 820 may be surrounded by a protective casing, which may also enclose the other elements included in the device 80. In an embodiment, a position of the user's fingers on the protective casing (but not directly on the surface of the display 820) may be detected by the touch panel 830 sensors. Accordingly, the controller 810 may perform display control processing described herein based on the detected position of the user's fingers gripping the casing. For example, an element in an interface may be moved to a new location within the interface (e.g., closer to one or more of the fingers) based on the detected finger position.

Further, in an embodiment, the controller 810 may be configured to detect which hand is holding the device 80, based on the detected finger position. For example, the touch panel 830 sensors may detect a plurality of fingers on the left side of the device 80 (e.g., on an edge of the display 820 or on the protective casing), and detect a single finger on the right side of the device 80. In this exemplary scenario, the controller 810 may determine that the user is holding the device 80 with his/her right hand because the detected grip pattern corresponds to an expected pattern when the device 80 is held only with the right hand.

The operation key 840 may include one or more buttons or similar external control elements, which may generate an operation signal based on a detected input by the user. In addition to outputs from the touch panel 830, these operation signals may be supplied to the controller 810 for performing related processing and control. In certain aspects of the present disclosure, the processing and/or functions associated with external buttons and the like may be performed by the controller 810 in response to an input operation on the touch panel 830 display screen rather than the external button, key, etc. In this way, external buttons on the device 80 may be eliminated in lieu of performing inputs via touch operations, thereby improving watertightness.

The antenna 806 may transmit/receive electromagnetic wave signals to/from other external apparatuses, and the short-distance wireless communication processor 807 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 807.

The device 80 may include a motion sensor 808. The motion sensor 808 may detect features of motion (i.e., one or more movements) of the device 80. For example, the motion sensor 808 may include an accelerometer to detect acceleration, a gyroscope to detect angular velocity, a geomagnetic sensor to detect direction, a geo-location sensor to detect location, etc., or a combination thereof to detect motion of the device 80. In an embodiment, the motion sensor 808 may generate a detection signal that includes data representing the detected motion. For example, the motion sensor 808 may determine a number of distinct movements in a motion (e.g., from start of the series of movements to the stop, within a predetermined time interval, etc.), a number of physical shocks on the device 80 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 810, whereby further processing may be performed based on data included in the detection signal. The motion sensor 808 can work in conjunction with a Global Positioning System (GPS) section 860. The information of the present position detected by the GPS section 860 is transmitted to the controller 810. An antenna 861 is connected to the GPS section 860 for receiving and transmitting signals to and from a GPS satellite.

The device 80 may include a camera section 809, which includes a lens and shutter for capturing photographs of the surroundings around the device 80. In an embodiment, the camera section 809 captures surroundings of an opposite side of the device 80 from the user. The images of the captured photographs can be displayed on the display panel 820. A memory section saves the captured photographs. The memory section may reside within the camera section 809 or it may be part of the memory 850. The camera section 809 can be a separate feature attached to the device 80 or it can be a built-in camera feature.

An example of a type of computer is shown in FIG. 9. The computer 900 can be used for the operations described in association with any of the computer-implement methods described previously, according to one implementation. For example, the computer 900 can be an example of devices 101, 102, 10n, 1001, or a server (such as device 150). The computer 900 includes processing circuitry, as discussed above. The device 150 may include other components not explicitly illustrated in FIG. 9 such as a CPU, GPU, frame buffer, etc. The processing circuitry includes one or more of the elements discussed next with reference to FIG. 9. In FIG. 9, the computer 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the computer 900. In one implementation, the memory 920 is a computer-readable medium. In one implementation, the memory 920 is a volatile memory. In another implementation, the memory 920 is a non-volatile memory.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the computer 900. In one implementation, the input/output device 940 includes a keyboard and/or pointing device. In another implementation, the input/output device 940 includes a display for displaying graphical user interfaces.

Next, a hardware description of a device according to exemplary embodiments is described with reference to FIG. 10. In FIG. 10, the device 100, which can be the above-described devices of FIG. 1, includes processing circuitry, as discussed above. The processing circuitry includes one or more of the elements discussed next with reference to FIG. 10. The device 100 may include other components not explicitly illustrated in FIG. 10 such as a CPU, GPU, frame buffer, etc. In FIG. 10, the device 100 includes a CPU 1000 which performs the processes described above/below. The process data and instructions may be stored in memory 1002. These processes and instructions may also be stored on a storage medium disk 1004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the claimed advancements may be provided as a utility application, background daemon, or component of an operating system, or combination thereof, executing in conjunction with CPU 1000 and an operating system such as Microsoft Windows, UNIX, Solaris, LINUX, Apple MAC-OS and other systems known to those skilled in the art.

The hardware elements in order to achieve the device may be realized by various circuitry elements, known to those skilled in the art. For example, CPU 1000 may be a Xenon or Core processor from Intel of America or an Opteron processor from AMD of America, or may be other processor types that would be recognized by one of ordinary skill in the art. Alternatively, the CPU 1000 may be implemented on an FPGA, ASIC, PLD or using discrete logic circuits, as one of ordinary skill in the art would recognize. Further, CPU 1000 may be implemented as multiple processors cooperatively working in parallel to perform the instructions of the processes described above. CPU 1000 can be an example of the CPU illustrated in each of the devices of FIG. 1.

The device 100 in FIG. 10 also includes a network controller 1006, such as an Intel Ethernet PRO network interface card from Intel Corporation of America, for interfacing with the network 1050 (also shown in FIG. 1), and to communicate with the other devices of FIG. 1. As can be appreciated, the network 1050 can be a public network, such as the Internet, or a private network such as an LAN or WAN network, or any combination thereof and can also include PSTN or ISDN sub-networks. The network 1050 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device further includes a display controller 1008, such as a NVIDIA GeForce GTX or Quadro graphics adaptor from NVIDIA Corporation of America for interfacing with display 1010, such as an LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners.

A sound controller 1020 is also provided in the device to interface with speakers/microphone 1022 thereby providing sounds and/or music.

The general-purpose storage controller 1024 connects the storage medium disk 1004 with communication bus 1026, which may be an ISA, EISA, VESA, PCI, or similar, for interconnecting all of the components of the device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

Figure 11:
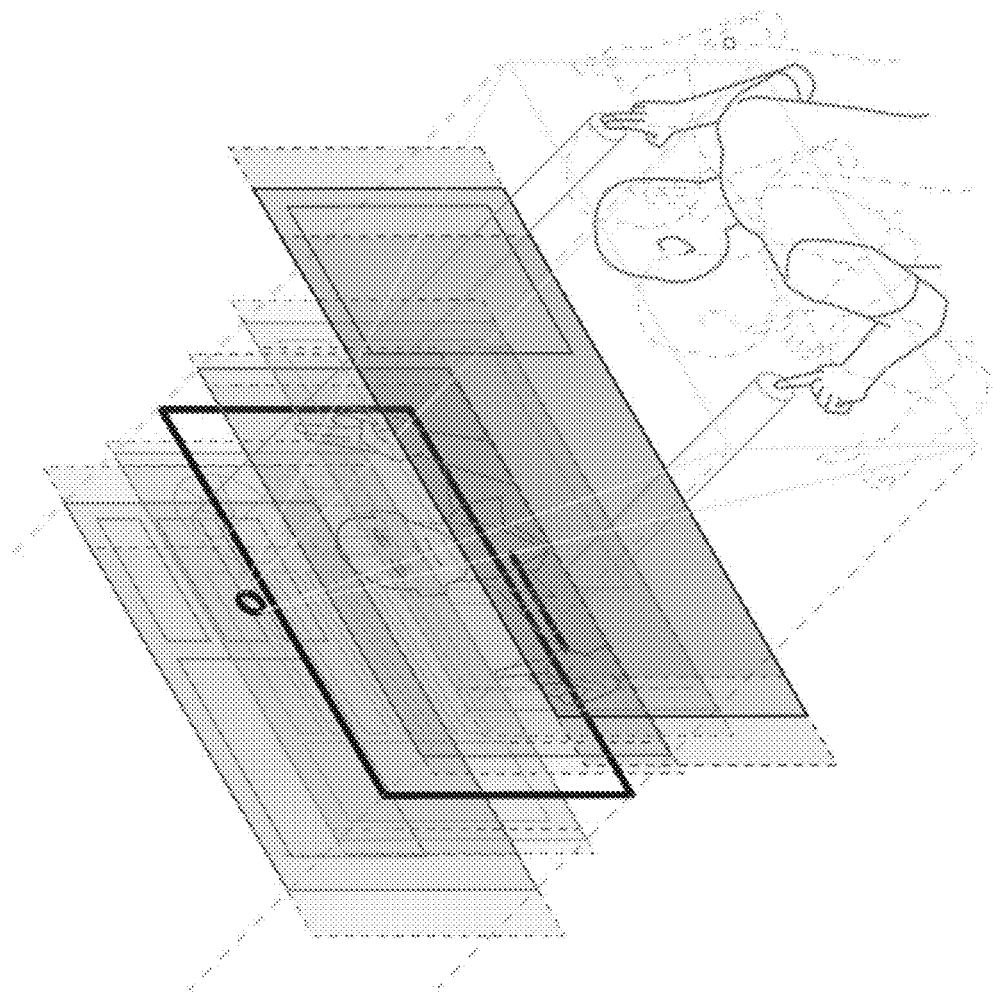
FIG. 11 is an example of Transparent Computing.

As shown in FIG. 11, in some embodiments, one or more of the disclosed functions and capabilities may be used to enable a volumetric composite of content-activated layers of Transparent Computing, content-agnostic layers of Transparent Computing and/or camera-captured layers of Transparent Computing placed visibly behind 2-dimensional or 3-dimensional content displayed on screens, placed in front of 2-dimensional or 3-dimensional content displayed on screens, placed inside of 3-dimensional content displayed on screens and/or placed virtually outside of the display of screens. Users can interact via Touchless Computing with any layer in a volumetric composite of layers of Transparent Computing wherein a user's gaze, gestures, movements, position, orientation, or other characteristics observed by a camera are used as the basis for selecting and interacting with objects in any layer in the volumetric composite of layers of Transparent Computing to execute processes on computing devices.

In some embodiments, one or more of the disclosed functions and capabilities may be used to enable users to see a volumetric composite of layers of Transparent Computing from a 360-degree Optical Lenticular Perspective wherein a user's gaze, gestures, movements, position, orientation, or other characteristics observed by cameras are a basis to calculate, derive and/or predict the 360-degree Optical Lenticular Perspective from which users see the volumetric composite of layers of Transparent Computing displayed on screens. Further, users can engage with a 3-dimensional virtual environment displayed on screens consisting of layers of Transparent Computing placed behind the 3-dimensional virtual environment displayed on screens, placed in front of a 3-dimensional virtual environment displayed on screens, and/or placed inside of the a 3-dimensional virtual environment displayed on screens wherein users can select and interact with objects in any layer of Transparent Computing to execute processes on computing devices while looking at the combination of the 3-dimensional virtual environment and the volumetric composite of layers of Transparent Computing from any angle of the 360-degree Optical Lenticular Perspective available to users.

Obviously, numerous modifications and variations are possible in light of the above teachings. It is therefore to be understood that within the scope of the appended claims, the embodiments may be practiced otherwise than as specifically described herein.

Embodiments of the present disclosure may also be as set forth in the following description.

A device communicating with another device over a data communication network includes: processing circuitry configured to receive a unique identifier having encoded data included in a reference patch embedded in displayed data received by the another device, the encoded data being decoded by the another device, the another device being instructed to display the displayed data in a first layer of the another device, the first layer of the another device being configured to display data of a first software application, the device being inaccessible by the first layer of the another device; identify an identity of a user based on the unique identifier of the reference patch embedded in the displayed data received by the another device in the first layer of the another device; determine whether the user is authorized to receive secondary digital content corresponding to the user identity based on the unique identifier of the reference patch embedded in the displayed data received by the another device in the first layer of the another device; upon determining the user is authorized to receive the secondary digital content, transmit the secondary digital content to the another device; and instruct the another device to display the secondary digital content in a second layer of the another device, the second layer of the another device being configured to display data of a second software application, the device being accessible by the second layer of the another device, the first layer of the another device being different from the second layer of the another device.

In an embodiment, the reference patch includes a secure session token, and the processing circuitry is further configured to receive the secure session token with the unique identifier of the reference patch.

In an embodiment, the processing circuitry is further configured to identify the identity of the user based on the unique identifier and the secure session token of the reference patch.

In an embodiment, the processing circuitry is further configured to determine whether the user is authorized to receive the secondary digital content corresponding to the user identity based on the unique identifier and the secure session token.

In an embodiment, the unique identifier includes a screen position within an available area of a display of the another device for the another device to display the secondary digital content in the second layer of the another device.

In an embodiment, the encoded data identifies the secondary digital content and a location address of the secondary digital content.

In an embodiment, the encoded data is decoded by using a convolution neural network (CNN)-based decoder of the electronic device.

A method includes: receiving, via processing circuitry of a server, a unique identifier having encoded data included in a reference patch embedded in displayed data received by an electronic device, the encoded data being decoded by the electronic device, the electronic device being instructed to display the displayed data in a first layer of the electronic device, the first layer being configured to display data of a first software application, the server being inaccessible by the first layer of the electronic device; identifying, via the processing circuitry of the server, an identity of a user based on the unique identifier of the reference patch embedded in the displayed data received by the electronic device in the first layer of the electronic device; determining, via the processing circuitry of the server, whether the user is authorized to receive secondary digital content corresponding to the user identity based on the unique identifier of the reference patch embedded in the displayed data received by the electronic device in the first layer of the electronic device; upon determining the user is authorized to receive the secondary digital content, transmitting, via the processing circuitry of the server, the secondary digital content to the electronic device; and instructing, via the processing circuitry of the server, the electronic device to display the secondary digital content in a second layer of the electronic device, the second layer of the electronic device being configured to display data of a second software application, the server being accessible by the second layer of the electronic device, the first layer of the electronic device being different from the second layer of the electronic device.

In an embodiment, the reference patch includes a secure session token, and the method further comprises receiving, via the processing circuitry of the server, the secure session token with the unique identifier of the reference patch.

In an embodiment, the method further comprises identifying, via the processing circuitry of the server, the identity of the user based on the unique identifier and the secure session token of the reference patch.

In an embodiment, the method further comprises determining, via the processing circuitry of the server, whether the user is authorized to receive the secondary digital content corresponding to the user identity based on the unique identifier and the secure session token.

In an embodiment, the unique identifier includes a screen position within an available area of a display of the electronic device for the electronic device to display the secondary digital content in the second layer of the electronic device.

In an embodiment, the encoded data identifies the secondary digital content and a location address of the secondary digital content.

In an embodiment, the encoded data is decoded by using a convolution neural network (CNN)-based decoder of the electronic device.

A non-transitory computer-readable storage medium for storing computer-readable instructions that, when executed by a computer, causes the computer to perform a method, the method including: receiving, via processing circuitry of a server, a unique identifier having encoded data included in a reference patch embedded in displayed data received by an electronic device, the encoded data being decoded by the electronic device, the electronic device being instructed to display the displayed data in a first layer of the electronic device, the first layer being configured to display data of a first software application, the server being inaccessible by the first layer of the electronic device; identifying, via the processing circuitry of the server, an identity of a user based on the unique identifier of the reference patch embedded in the displayed data received by the electronic device in the first layer of the electronic device; determining, via the processing circuitry of the server, whether the user is authorized to receive secondary digital content corresponding to the user identity based on the unique identifier of the reference patch embedded in the displayed data received by the electronic device in the first layer of the electronic device; upon determining the user is authorized to receive the secondary digital content, transmitting, via the processing circuitry of the server, the secondary digital content to the electronic device; and instructing, via the processing circuitry of the server, the electronic device to display the secondary digital content in a second layer of the electronic device, the second layer of the electronic device being configured to display data of a second software application, the server being accessible by the second layer of the electronic device, the first layer of the electronic device being different from the second layer of the electronic device.

In an embodiment, the reference patch includes a secure session token, and the method further comprises receiving, via the processing circuitry of the server, the secure session token with the unique identifier of the reference patch.

In an embodiment, the method further comprises identifying, via the processing circuitry of the server, the identity of the user based on the unique identifier and the secure session token of the reference patch.

In an embodiment, the method further comprises determining, via the processing circuitry of the server, whether the user is authorized to receive the secondary digital content corresponding to the user identity based on the unique identifier and the secure session token.

In an embodiment, the unique identifier includes a screen position within an available area of a display of the electronic device for the electronic device to display the secondary digital content in the second layer of the electronic device.

In an embodiment, the encoded data identifies the secondary digital content and a location address of the secondary digital content.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Thus, the foregoing discussion discloses and describes merely exemplary embodiments. As will be understood by those skilled in the art, the present disclosure may be embodied in other specific forms without departing from the spirit or essential characteristics thereof. Accordingly, the disclosure is intended to be illustrative, but not limiting of the scope of thereof, as well as other claims. The disclosure, including any readily discernible variants of the teachings herein, defines, in part, the scope of the foregoing claim terminology such that no inventive subject matter is dedicated to the public.

The invention claimed is:

1. A device communicating with another device over a data communication network, the device comprising:
processing circuitry configured to
receive a unique identifier having encoded data included in a reference patch embedded in displayed data received by the another device, the encoded data being decoded by the another device, the another device being instructed to display the displayed data in a first layer of the another device, the first layer of the another device being configured to display data of a first software application, the device being inaccessible by the first layer of the another device;
identify an identity of a user based on the unique identifier of the reference patch embedded in the displayed data received by the another device in the first layer of the another device;
determine whether the user is authorized to receive secondary digital content corresponding to the user identity based on the unique identifier of the reference patch embedded in the displayed data received by the another device in the first layer of the another device;
upon determining the user is authorized to receive the secondary digital content, transmit the secondary digital content to the another device; and
instruct the another device to display the secondary digital content in a second layer of the another device, the second layer of the another device being configured to display data of a second software application, the device being accessible by the second layer of the another device, the first layer of the another device being different from the second layer of the another device.

2. The device of claim 1, wherein the reference patch includes a secure session token, and the processing circuitry is further configured to receive the secure session token with the unique identifier of the reference patch.

3. The device of claim 2, wherein the processing circuitry is further configured to identify the identity of the user based on the unique identifier and the secure session token of the reference patch.

4. The device of claim 3, wherein the processing circuitry is further configured to determine whether the user is authorized to receive the secondary digital content corresponding to the user identity based on the unique identifier and the secure session token.

5. The device of claim 1, wherein the unique identifier includes a screen position within an available area of a display of the another device for the another device to display the secondary digital content in the second layer of the another device.

6. The device of claim 1, wherein the encoded data identifies the secondary digital content and a location address of the secondary digital content.

7. The device of claim 1, wherein the encoded data is decoded by using a convolution neural network (CNN)-based decoder of the electronic device.

8. A method, comprising:
receiving, via processing circuitry of a server, a unique identifier having encoded data included in a reference patch embedded in displayed data received by an electronic device, the encoded data being decoded by the electronic device, the electronic device being instructed to display the displayed data in a first layer of the electronic device, the first layer being configured to display data of a first software application, the server being inaccessible by the first layer of the electronic device;
identifying, via the processing circuitry of the server, an identity of a user based on the unique identifier of the reference patch embedded in the displayed data received by the electronic device in the first layer of the electronic device;
determining, via the processing circuitry of the server, whether the user is authorized to receive secondary digital content corresponding to the user identity based on the unique identifier of the reference patch embedded in the displayed data received by the electronic device in the first layer of the electronic device;

upon determining the user is authorized to receive the secondary digital content, transmitting, via the processing circuitry of the server, the secondary digital content to the electronic device; and instructing, via the processing circuitry of the server, the electronic device to display the secondary digital content in a second layer of the electronic device, the second layer of the electronic device being configured to display data of a second software application, the server being accessible by the second layer of the electronic device, the first layer of the electronic device being different from the second layer of the electronic device.

9. The method of claim 8, wherein the reference patch includes a secure session token, and the method further comprises receiving, via the processing circuitry of the server, the secure session token with the unique identifier of the reference patch.

10. The method of claim 9, further comprising identifying, via the processing circuitry of the server, the identity of the user based on the unique identifier and the secure session token of the reference patch.

11. The method of claim 10, further comprising determining, via the processing circuitry of the server, whether the user is authorized to receive the secondary digital content corresponding to the user identity based on the unique identifier and the secure session token.

12. The method of claim 8, wherein the unique identifier includes a screen position within an available area of a display of the electronic device for the electronic device to display the secondary digital content in the second layer of the electronic device.

13. The method of claim 8, wherein the encoded data identifies the secondary digital content and a location address of the secondary digital content.

14. The method of claim 8, wherein the encoded data is decoded by using a convolution neural network (CNN)-based decoder of the electronic device.

15. A non-transitory computer-readable storage medium for storing computer-readable instructions that, when executed by a computer, cause the computer to perform a method, the method comprising:

receiving, via processing circuitry of a server, a unique identifier having encoded data included in a reference patch embedded in displayed data received by an electronic device, the encoded data being decoded by the electronic device, the electronic device being instructed to display the displayed data in a first layer of the electronic device, the first layer being configured to display data of a first software application, the server being inaccessible by the first layer of the electronic device;

identifying, via the processing circuitry of the server, an identity of a user based on the unique identifier of the reference patch embedded in the displayed data received by the electronic device in the first layer of the electronic device;

determining, via the processing circuitry of the server, whether the user is authorized to receive secondary digital content corresponding to the user identity based on the unique identifier of the reference patch embedded in the displayed data received by the electronic device in the first layer of the electronic device;

upon determining the user is authorized to receive the secondary digital content, transmitting, via the processing circuitry of the server, the secondary digital content to the electronic device; and instructing, via the processing circuitry of the server, the electronic device to display the secondary digital content in a second layer of the electronic device, the second layer of the electronic device being configured to display data of a second software application, the server being accessible by the second layer of the electronic device, the first layer of the electronic device being different from the second layer of the electronic device.

16. The non-transitory computer-readable storage medium according to claim 15, wherein the reference patch includes a secure session token, and the method further comprises receiving, via the processing circuitry of the server, the secure session token with the unique identifier of the reference patch.

17. The non-transitory computer-readable storage medium according to claim 16, wherein the method further comprises identifying, via the processing circuitry of the server, the identity of the user based on the unique identifier and the secure session token of the reference patch.

18. The non-transitory computer-readable storage medium according to claim 17, wherein the method further comprises determining, via the processing circuitry of the server, whether the user is authorized to receive the secondary digital content corresponding to the user identity based on the unique identifier and the secure session token.

19. The non-transitory computer-readable storage medium according to claim 15, wherein the unique identifier includes a screen position within an available area of a display of the electronic device for the electronic device to display the secondary digital content in the second layer of the electronic device.

20. The non-transitory computer-readable storage medium according to claim 15, wherein the encoded data identifies the secondary digital content and a location address of the secondary digital content.

* * * * *